US012786021B2

(12) United States Patent
Köck et al.

(10) Patent No.: US 12,786,021 B2
(45) Date of Patent: Nov. 3, 2026

(54) FLEXIBLE ADAPTATIONS OF SHORT PULSE WIDTH MODULATION (PWM) CODE (SPC) COMMUNICATION

(71) Applicant: Infineon Technologies AG, Neubiberg (DE)

(72) Inventors: Helmut Köck, Villach (AT); Dirk Hammerschmidt, Finkenstein (AT); Michael Strasser, Villach (AT); Christoph Krall, Klagenfurt (AT); Stefan Lanschützer, St. Margarethen (AT); Konrad Kapser, Graefelfing (DE); Tobias Werth, Villach (AT)

(73) Assignee: Infineon Technologies AG, Neubiberg (DE)

( * ) Notice: Subject to any disclaimer, the term of this patent is extended or adjusted under 35 U.S.C. 154(b) by 37 days.

(21) Appl. No.: 18/895,685

(22) Filed: Sep. 25, 2024

(65) Prior Publication Data

US 2026/0089039 A1 Mar. 26, 2026

(51) Int. Cl.
*H04L 25/49* (2006.01)
*H04L 7/06* (2006.01)

(52) U.S. Cl.
CPC ............ *H04L 25/4902* (2013.01); *H04L 7/06* (2013.01)

(58) Field of Classification Search
CPC ... H04L 25/4902; H04L 7/06; H04B 25/4902; H04B 14/04
See application file for complete search history.

(56) References Cited

U.S. PATENT DOCUMENTS 4,215,348 A * 7/1980 Cordaro ................ H04L 7/0012 370/324
4,897,854 A * 1/1990 Harris ................. H04L 25/4902 375/258

(Continued)

FOREIGN PATENT DOCUMENTS

EP 0717528 B1 5/2003
EP 3126994 B1 * 9/2018 ......... H04L 12/6418

(Continued)

OTHER PUBLICATIONS

P. Kumar, I. Ali, M. Asif, Y. G. Pu and K. -Y. Lee, "A Design of SPC Transceiver for Automotive Applications in 180nm CMOS Process," 2021 IEEE International Conference on Consumer Electronics-Asia (ICCE-Asia), Gangwon, Korea, Republic of, 2021, pp. 1-4, (Year: 2021).*

(Continued)

*Primary Examiner* — Berhanu Tadese
(74) *Attorney, Agent, or Firm* — Banner & Witcoff, Ltd.

(57) ABSTRACT

The described techniques enhance the conventional SPC communication protocol in various ways to provide further flexibility for various applications while improving performance. This includes the use of an alternative trigger signal that may encode a time base reference of a primary device as well as state data (e.g. an address, configuration data, etc.), which is transmitted to one or more secondary devices. This also includes the use of an end-of-frame (EoF) signal that may be introduced into an SPC data frame to enable the use of a variable data frame length. Still further, techniques are described for the use of another alternate trigger signal that includes a wake up signal that is recognized by a receiving device, which causes the receiving device to transition from a low power mode of operation to a communicating mode of operation.

25 Claims, 13 Drawing Sheets

1200

(56) References Cited

U.S. PATENT DOCUMENTS

| | | | | | |
|---|---|---|---|---|---|
| 5,446,757 | A * | 8/1995 | Chang | H04L 25/493 | 375/140 |
| 5,448,554 | A * | 9/1995 | Van Steenbrugge | H04L 12/4135 | 714/28 |
| 5,615,228 | A * | 3/1997 | Soenen | H04L 25/4902 | 341/53 |
| 5,621,758 | A * | 4/1997 | Suzuki | H04L 25/4902 | 327/31 |
| 5,712,871 | A * | 1/1998 | Chang | H04L 25/4902 | 375/147 |
| 5,802,595 | A * | 9/1998 | Shibuya | G06F 13/385 | 710/52 |
| 5,970,069 | A * | 10/1999 | Kumar | H04L 69/12 | 370/402 |
| 5,977,822 | A * | 11/1999 | Rybicki | H03K 9/10 | 329/313 |
| 6,089,453 | A * | 7/2000 | Kayser | G06K 17/00 | 235/462.46 |
| 6,212,230 | B1 * | 4/2001 | Rybicki | H04B 14/026 | 332/112 |
| 6,219,380 | B1 * | 4/2001 | Wang | H04B 14/026 | 332/112 |
| 6,275,526 | B1 * | 8/2001 | Kim | H04L 25/4902 | 375/238 |
| 6,359,525 | B1 * | 3/2002 | Mohan | H04L 25/4902 | 329/312 |
| 6,671,316 | B1 * | 12/2003 | Hamre | H04L 25/4902 | 375/295 |
| 6,711,122 | B1 * | 3/2004 | Langley | H04L 1/1685 | 370/205 |
| 6,901,112 | B2 * | 5/2005 | McCorkle | H04L 27/0004 | 370/324 |
| 7,035,344 | B2 * | 4/2006 | Feher | H04L 25/4902 | 375/271 |
| 7,136,419 | B2 * | 11/2006 | Dress | H04B 14/04 | 375/242 |
| 7,158,593 | B2 * | 1/2007 | Kim | H04L 5/06 | 375/354 |
| 7,180,850 | B2 * | 2/2007 | Langley | H04L 5/06 | 370/205 |
| 7,245,668 | B2 * | 7/2007 | Feher | H04L 25/4902 | 375/295 |
| 7,260,151 | B2 * | 8/2007 | Cohen | H04L 25/4902 | 375/242 |
| 7,391,716 | B2 * | 6/2008 | Ozawa | H04L 25/4902 | 327/175 |
| 7,453,950 | B2 * | 11/2008 | Sun | H04B 14/026 | 375/259 |
| 7,466,770 | B2 * | 12/2008 | Kirn | H04L 25/4902 | 375/316 |
| 7,539,245 | B2 * | 5/2009 | Venna | H04L 25/4902 | 375/239 |
| 7,564,863 | B2 * | 7/2009 | Langley | H04L 1/188 | 370/430 |
| 7,626,918 | B2 * | 12/2009 | Langley | H04B 14/066 | 370/205 |
| 7,627,044 | B2 * | 12/2009 | Kim | H04L 25/0284 | 375/257 |
| 7,706,247 | B2 * | 4/2010 | Langley | H04L 1/1685 | 370/205 |
| 7,876,836 | B2 * | 1/2011 | Dress | H04B 14/04 | 375/242 |
| 7,894,562 | B2 * | 2/2011 | Konz | H04L 25/491 | 375/333 |
| 7,982,640 | B2 * | 7/2011 | Okuno | H03M 9/00 | 341/100 |
| 8,031,105 | B2 * | 10/2011 | Stayton | H04L 27/10 | 342/36 |
| 8,103,002 | B2 * | 1/2012 | Kim | H04L 27/001 | 380/263 |
| 8,149,879 | B2 * | 4/2012 | Rogerson | H04L 25/4902 | 370/347 |
| 8,183,982 | B2 * | 5/2012 | Scherr | H04L 25/4902 | 340/10.3 |
| 8,229,006 | B2 * | 7/2012 | Dress | H04B 14/04 | 375/242 |
| 8,284,830 | B2 * | 10/2012 | Lee | H04L 25/493 | 327/31 |
| 8,315,303 | B1 * | 11/2012 | Chana | H04L 25/4902 | 375/296 |
| 8,509,318 | B2 * | 8/2013 | Tailliet | G06F 13/4295 | 327/31 |
| 8,519,819 | B2 * | 8/2013 | Scherr | H04L 5/1484 | 340/10.3 |
| 8,594,175 | B2 * | 11/2013 | Lee | H03K 9/04 | 375/361 |
| 8,625,661 | B2 * | 1/2014 | Lee | H04L 25/4902 | 332/112 |
| 8,699,371 | B2 * | 4/2014 | Reidl | H04L 25/4902 | 370/252 |
| 8,711,898 | B2 * | 4/2014 | Santhoff | H04W 28/18 | 375/267 |
| 8,724,614 | B2 * | 5/2014 | Quick | H04N 19/89 | 370/336 |
| 8,922,331 | B2 * | 12/2014 | Scherr | H04L 25/4902 | 340/10.3 |
| 8,938,014 | B1 * | 1/2015 | Wang | H04L 25/4902 | 375/259 |
| 8,948,280 | B2 * | 2/2015 | Hammerschmidt | H04L 25/4902 | 375/260 |
| 8,958,497 | B2 * | 2/2015 | Lee | H04B 3/23 | 375/285 |
| 8,971,206 | B2 * | 3/2015 | Reidl | H04L 25/4902 | 370/252 |
| 9,007,951 | B2 * | 4/2015 | Reidl | H04L 25/4904 | 370/252 |
| 9,071,410 | B2 * | 6/2015 | Lee | H04L 7/033 | |
| 9,166,843 | B2 * | 10/2015 | Huang | H04L 25/4902 | |
| 9,172,565 | B2 * | 10/2015 | Cadugan | H04L 7/042 | |
| 9,191,189 | B2 * | 11/2015 | Dalton | H04L 7/0087 | |
| 9,203,391 | B2 * | 12/2015 | Zhu | G06F 13/4072 | |
| 9,262,365 | B2 * | 2/2016 | Hartwich | H04L 12/4013 | |
| 9,287,902 | B2 * | 3/2016 | Li | H04B 1/02 | |
| 9,337,888 | B2 * | 5/2016 | Glänzer | H04L 27/2032 | |
| 9,374,174 | B1 * | 6/2016 | Hammerschmidt | H04L 25/0278 | |
| 9,444,613 | B2 * | 9/2016 | Hammerschmidt | H04L 7/10 | |
| 9,461,707 | B1 * | 10/2016 | Virden | H04B 3/542 | |
| 9,537,687 | B2 * | 1/2017 | Mishra | H03M 5/08 | |
| 9,634,715 | B2 * | 4/2017 | Scheinkerman | H04L 67/12 | |
| 9,667,409 | B2 * | 5/2017 | Scherr | H04L 7/00 | |
| 9,710,423 | B2 * | 7/2017 | Sengoku | G06F 13/42 | |
| 9,729,200 | B2 * | 8/2017 | Virden | H04L 25/4902 | |
| 9,762,419 | B2 * | 9/2017 | Strasser | H04L 25/4902 | |
| 9,787,495 | B2 * | 10/2017 | Vreeland | H04L 12/403 | |
| 9,875,209 | B2 * | 1/2018 | Mishra | H04L 25/4902 | |
| 9,882,579 | B2 * | 1/2018 | Hammerschmidt | H03M 5/22 | |
| 9,928,208 | B2 * | 3/2018 | Sengoku | G06F 13/364 | |
| 9,959,128 | B2 * | 5/2018 | Bodner | G06F 13/364 | |
| 9,970,982 | B2 * | 5/2018 | Morici | G01R 31/2829 | |
| 10,012,154 | B2 * | 7/2018 | Levy | F02D 29/02 | |
| 10,135,634 | B2 * | 11/2018 | Scherr | H04L 12/40019 | |
| 10,288,727 | B2 * | 5/2019 | Stayton | H04B 7/18506 | |
| 10,305,672 | B2 * | 5/2019 | Kaneko | G06F 13/40 | |
| 10,348,417 | B1 * | 7/2019 | Krall | H04L 25/4902 | |
| 10,547,477 | B2 * | 1/2020 | Nguyen | H04W 56/001 | |
| 10,581,543 | B2 * | 3/2020 | Aichriedler | H04Q 9/04 | |
| 10,594,440 | B2 * | 3/2020 | Hammerschmidt | H04L 25/4902 | |
| 10,649,835 | B2 * | 5/2020 | Granig | G06F 11/0793 | |
| 10,693,674 | B2 * | 6/2020 | Mishra | H04L 12/40156 | |
| 10,700,848 | B2 * | 6/2020 | Scherr | H04L 7/00 | |
| 10,735,298 | B2 * | 8/2020 | Chen | A61B 5/7253 | |
| 10,872,055 | B2 * | 12/2020 | Mishra | H04L 25/4902 | |
| 10,903,865 | B2 * | 1/2021 | Rasbornig | H04B 1/16 | |
| 10,944,538 | B2 * | 3/2021 | Ayling | H04B 10/676 | |

(56) References Cited

U.S. PATENT DOCUMENTS 10,965,313 B2 * 3/2021 Hammerschmidt .... H03M 5/22
10,982,982 B2 * 4/2021 Hammerschmidt .... H04L 67/12
10,985,900 B1 * 4/2021 Abdo ...................... H04L 7/027
11,003,615 B2 * 5/2021 Bas ....................... G06F 13/364
11,055,423 B2 * 7/2021 Hammerschmidt .... G06F 21/64
11,121,810 B2 * 9/2021 Anastasov ............ H04L 5/0044
11,211,926 B2 * 12/2021 Hammerschmidt ... G08C 19/22
11,245,673 B2 * 2/2022 Rasbornig ............. H04L 9/0819
11,356,201 B2 * 6/2022 Hammerschmidt ......................... H04L 25/4902
11,372,441 B2 * 6/2022 Rupert ...................... G06F 1/12
11,417,349 B2 * 8/2022 Lesso ...................... H04L 25/49
11,641,268 B2 * 5/2023 Bettagere Krishnamurthy ........... G06F 1/12 375/355
11,650,083 B2 * 5/2023 Hammerschmidt .... H04W 4/38 702/189
11,671,409 B2 * 6/2023 Hammerschmidt ......................... H04L 63/0428 380/37
11,861,957 B2 * 1/2024 Bennington ............ G06F 16/27
11,902,062 B2 * 2/2024 Banin ................. H04L 25/4902
12,002,482 B2 * 6/2024 Lesso ...................... G06F 3/162
RE50,036 E * 7/2024 Aichriedler ............ G01D 21/00
12,107,709 B1 * 10/2024 Drullinger ............. H04B 10/11
12,176,891 B2 * 12/2024 Hammerschmidt ..... G01D 9/00
12,467,990 B2 * 11/2025 Daigle ............... G01R 33/0082
2002/0017949 A1 * 2/2002 Gfeller ................ H04L 25/4902 329/313
2002/0071484 A1 * 6/2002 Spichale ............. H04L 25/4902 370/212
2002/0163976 A1 * 11/2002 Karthaus ............... H04L 7/0066 375/295
2003/0202537 A1 * 10/2003 Rogerson ............. H03K 3/0315 370/478
2004/0008729 A1 * 1/2004 Rogerson .................. H04L 5/06 370/480
2004/0057500 A1 * 3/2004 Balachandran ...... H04B 1/7176 375/138
2004/0101060 A1 * 5/2004 Simon ................... H04L 25/085 375/257
2004/0136399 A1 * 7/2004 Roberts ................... H04L 27/02 370/479
2004/0142663 A1 * 7/2004 Roberts ................. H04W 16/14 455/39
2005/0163235 A1 * 7/2005 Mo ..................... H04L 25/4902 375/260
2006/0018376 A1 * 1/2006 Schmidt ................. G08C 17/02 375/239
2007/0263589 A1 * 11/2007 Francescon ........... H04L 7/0008 370/503
2009/0046773 A1 * 2/2009 Scherr ....................... H04L 7/06 375/238
2009/0129460 A1 * 5/2009 Nakasha .............. H04B 1/7163 375/295
2009/0134948 A1 * 5/2009 Miwa ...................... H03M 5/08 332/112
2009/0232197 A1 * 9/2009 Mimura ............... H04B 1/7174 375/239
2009/0322587 A1 * 12/2009 Stayton ................... H04L 27/26 342/37
2010/0002821 A1 * 1/2010 Hammerschmidt .. H04L 7/0278 375/360
2010/0183053 A1 * 7/2010 Tran .................... H04L 25/4904 375/295
2010/0188253 A1 * 7/2010 Shearer ............... H04L 25/4902 340/853.3
2013/0094373 A1 * 4/2013 Reidl .................. H04L 25/4902 370/252
2013/0163681 A1 * 6/2013 Wolter ................... H04B 3/542 375/257
2013/0197920 A1 * 8/2013 Lesso .................. H04L 25/4902 704/500
2013/0230076 A1 * 9/2013 Maggio ............... H04L 25/4902 375/130
2014/0169423 A1 * 6/2014 Scherr ................. H04L 25/4902 375/219
2014/0198833 A1 * 7/2014 Reidl .................. H04L 25/4902 375/224
2014/0241414 A1 * 8/2014 Reidl .................. H04L 25/4904 375/238
2014/0254731 A1 * 9/2014 Bowling ................ H04L 7/044 375/355
2014/0294131 A9 * 10/2014 Hammerschmidt ...... H04L 7/10 375/360
2015/0194992 A1 * 7/2015 Rasbornig ................ H04B 1/16 375/316
2015/0236746 A1 * 8/2015 Scheinkerman .......... G06F 3/00 375/219
2015/0236869 A1 * 8/2015 Vreeland ............... H04L 12/403 370/254
2016/0013957 A1 * 1/2016 Lee ....................... H04L 7/0331 375/238
2016/0103173 A1 * 4/2016 Morici ................. G01R 31/006 324/750.3
2017/0048207 A1 * 2/2017 Mallett ............... H02J 13/1333
2017/0230168 A1 * 8/2017 Scherr ..................... H04L 7/044
2017/0242709 A1 * 8/2017 Bodner ................. G06F 1/3287
2017/0244583 A1 * 8/2017 Dress .................. H04L 25/4902
2017/0250961 A1 * 8/2017 Rasbornig ............. H04L 9/0819
2018/0123823 A1 * 5/2018 Scherr .................. H04L 12/403
2018/0139311 A1 * 5/2018 Huang .................. H04L 1/0002
2018/0172484 A1 * 6/2018 Hammerschmidt ...... G06F 1/12
2018/0198545 A1 * 7/2018 Aichriedler .............. H04Q 9/04
2018/0226967 A1 * 8/2018 Hammerschmidt ... G08C 19/22
2018/0239664 A1 * 8/2018 Granig ................ G06F 11/0757
2019/0199451 A1 * 6/2019 Krall .................... H04B 14/026
2019/0199558 A1 * 6/2019 Nguyen .............. H04W 56/001
2019/0303592 A1 * 10/2019 Hammerschmidt .. H03M 13/09
2019/0372680 A1 * 12/2019 Itou ...................... H04B 14/026
2020/0220656 A1 * 7/2020 Hammerschmidt .. H04L 1/0061
2021/0239496 A1 * 8/2021 Hammerschmidt .... H04W 4/38
2022/0006608 A1 * 1/2022 Fang ..................... H04L 7/0079
2022/0123746 A1 * 4/2022 Hammerschmidt ..... G01D 9/00
2022/0263806 A1 * 8/2022 Hammerschmidt ......................... H04L 63/0428
2023/0269118 A1 * 8/2023 Henson ............... H04L 25/4902 375/238
2025/0004977 A1 * 1/2025 Leisenheimer ..... G06F 13/4022
2025/0076421 A1 * 3/2025 Daigle ............... G01R 33/0082

FOREIGN PATENT DOCUMENTS

EP 3262796 B1 * 8/2019 ........... H04L 12/403
EP 3469487 B1 * 12/2019 ........... H04L 7/0008
EP 3269094 B1 * 9/2020 ........... H04L 12/403
EP 3736989 A1 * 11/2020 ............. H03M 5/06
KR 20150128658 A * 11/2015 ............. H04L 7/044
KR 20160020370 A * 2/2016 ....... H04L 12/40006
KR 20170128435 A * 11/2017 ........... H04L 12/403
KR 20170128436 A * 11/2017 ........... H04L 12/403
WO WO-8500687 A1 * 2/1985 ............. G11B 20/20
WO WO-9919829 A1 * 4/1999 ............. G06Q 30/06
WO WO-9953622 A1 * 10/1999 ............... H04L 7/10
WO WO-0046922 A1 * 8/2000 ........... H04L 1/1685
WO WO-0209381 A2 * 1/2002 ......... H04L 25/4917
WO WO-03065671 A1 * 8/2003 ......... H04L 25/4902
WO WO-2004049659 A2 * 6/2004 ........... H04L 25/085
WO WO-2004066576 A1 * 8/2004 ......... H04L 25/4904
WO WO-2004075441 A1 * 9/2004 ............. H04M 5/04
WO WO-2004098074 A2 * 11/2004 ........... H04B 1/7176
WO WO-2006092424 A1 * 9/2006 ......... H04L 25/4902
WO WO-2009008862 A1 * 1/2009 ........... G01V 11/002
WO WO-2012010676 A1 * 1/2012 ........... H04B 13/005
WO WO-2013044686 A1 * 4/2013 ......... H04L 25/4902
WO WO-2013088173 A1 * 6/2013 ............. H04L 25/49
WO WO-2013188022 A1 * 12/2013 ............. H04L 7/033
WO WO-2014138334 A1 * 9/2014 ............. H04L 7/044
WO WO-2014182448 A2 * 11/2014 ......... H04L 25/4902

(56) References Cited

FOREIGN PATENT DOCUMENTS

| | | | | | |
|---|---|---|---|---|---|
| WO | WO-2015040400 | A1 | * | 3/2015 | ............. E21B 47/13 |
| WO | WO-2015054539 | A1 | * | 4/2015 | ............. G06F 1/266 |
| WO | WO-2015153773 | A1 | * | 10/2015 | ......... H04L 12/6418 |
| WO | WO-2016126862 | A1 | * | 8/2016 | .............. H03M 5/08 |
| WO | WO-2016144555 | A1 | * | 9/2016 | ........... H04L 12/403 |
| WO | WO-2016144556 | A1 | * | 9/2016 | ........... H04L 12/403 |
| WO | WO-2016186757 | A1 | * | 11/2016 | ......... H04L 25/4902 |
| WO | WO-2018026871 | A1 | * | 2/2018 | ......... G06F 13/4291 |
| WO | WO-2019051218 | A1 | * | 3/2019 | ............ H04J 3/0614 |
| WO | WO-2019148111 | A1 | * | 8/2019 | ......... G06F 13/4291 |
| WO | WO-2020185752 | A1 | * | 9/2020 | ........... H04L 12/413 |
| WO | WO-2020226941 | A1 | * | 11/2020 | ........... G05B 19/042 |
| WO | WO-2021133370 | A1 | * | 7/2021 | ......... H04L 25/4902 |
| WO | WO-2023164150 | A1 | * | 8/2023 | ........... G06F 13/426 |
| WO | WO-2025048950 | A1 | * | 3/2025 | ......... G01R 33/0094 |
| WO | WO-2025082288 | A1 | * | 4/2025 | ......... H04L 25/4902 |
| WO | WO-2025158147 | A1 | * | 7/2025 | ............... H04B 5/24 |

OTHER PUBLICATIONS

Mar. 9, 2026 (PCT) International Search Report—App. PCT/EP2025/077454.

Dec. 2, 20253 (PCT) International Search Report and Written Opinion—App. PCT/EP2025/077454.

* cited by examiner

100

200

400

500

550

600

700

800

900

1000

1100

1200

FLEXIBLE ADAPTATIONS OF SHORT PULSE WIDTH MODULATION (PWM) CODE (SPC) COMMUNICATION

TECHNICAL FIELD

The disclosure generally relates to the use of data communications and, more particularly, to the use of data communications that provide flexible adaptations of short pulse width modulation (PWM) code (SPC) protocol communications.

BACKGROUND

Sensors are implemented in a variety of applications that require the communication of measured sensor data to another component of an overall system, such as a microcontroller or electronic control unit (ECU) for instance. Such communications may include the SAE J2716 SENT (Single Edge Nibble Transmission) protocol, which is a point-to-point scheme for transmitting signal values from a secondary device (e.g. a sensor) to a primary device (e.g. a microcontroller, ECU, etc.). However, some important features are omitted in the SENT standard, and thus the SPC protocol was developed to address these issues and provide further enhancements. Nonetheless, the current SPC protocol is generally implemented to enable the primary device to listen to data transmissions from the connected secondary devices, and thus conventional SPC protocols often implement unidirectional communications that require the primary device to adapt to the time base of the secondary devices. This requires the need for the secondary device to transmit a sync pulse, introducing latency in such communications. Additionally, conventional SPC protocols suffer from drawbacks such as the use of a fixed frame length and the inability to provide adaptable solutions for specific sensors that may require customized commands and/or configurations.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

Figure 9:
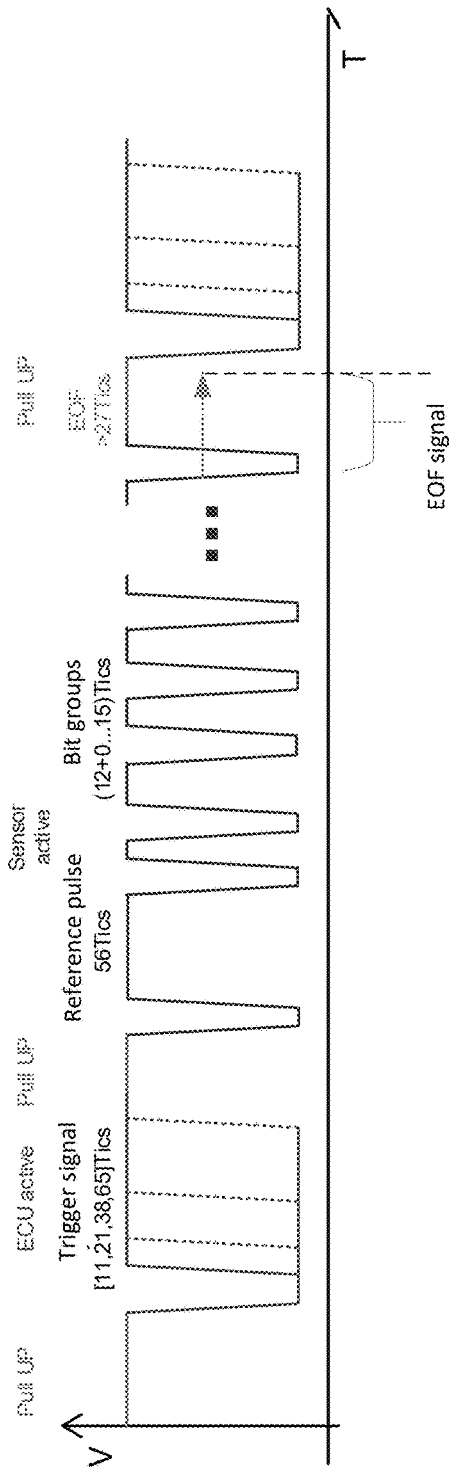
Figure 10:
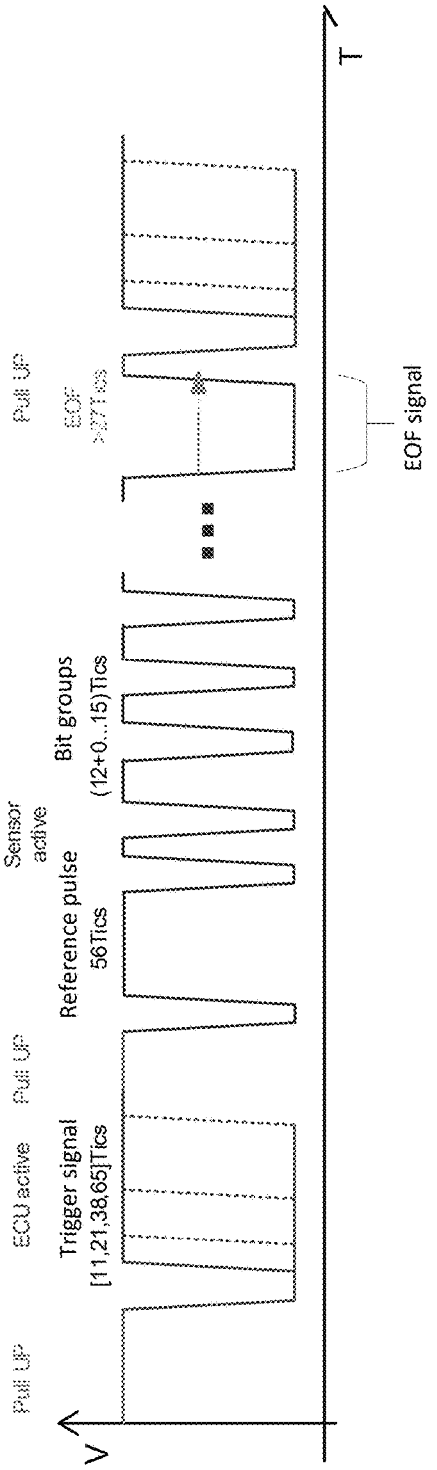
Figure 11:
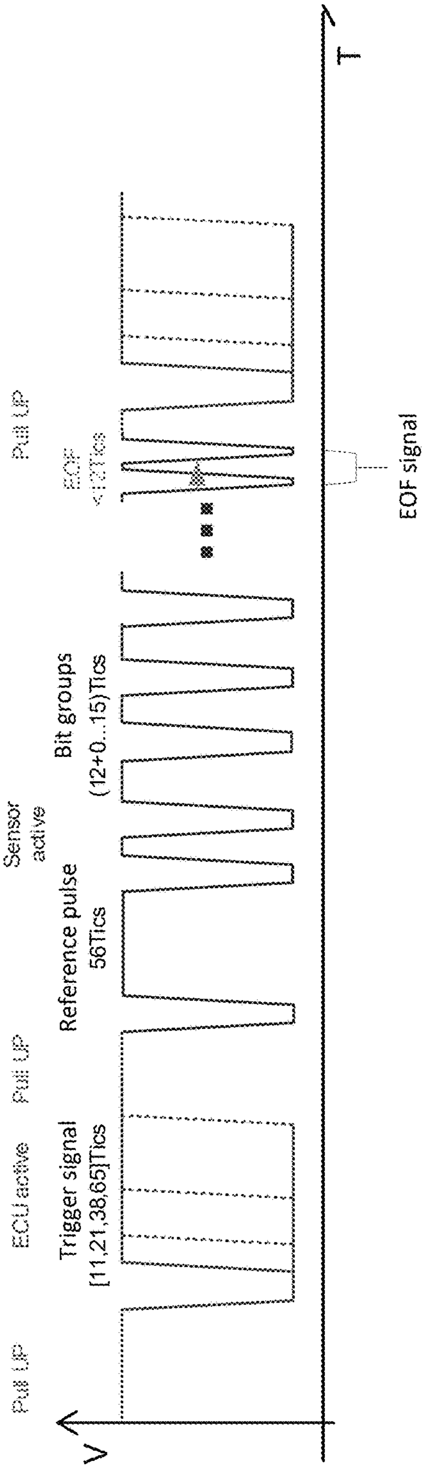
Figure 12:
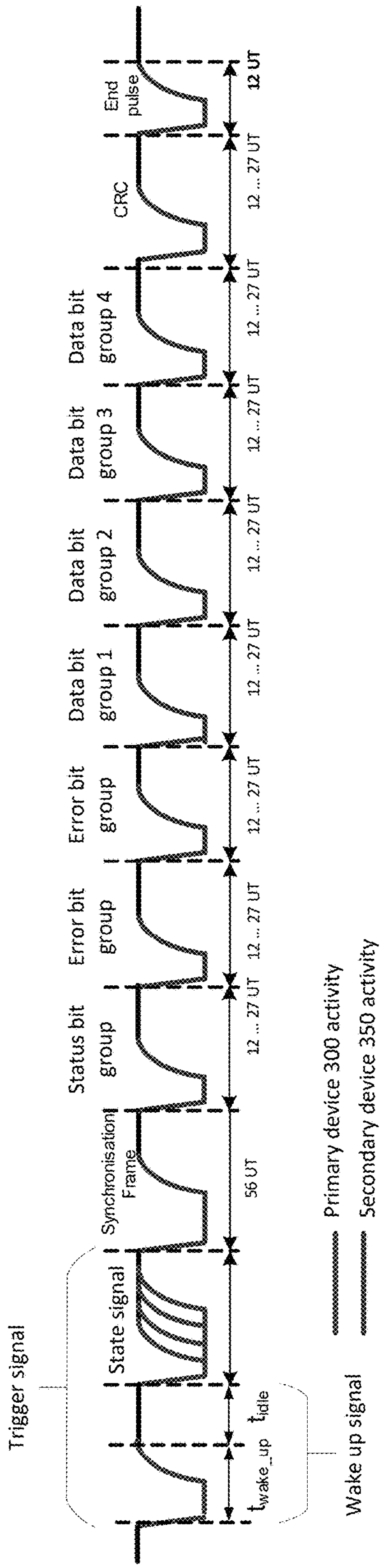

FIGS. 4, 5A-5B, and 6-8 illustrate example signaling schemes to implement an alternate SPC trigger signal with increased resolution and reference time base delivery, in accordance with one or more embodiments of the disclosure;

FIGS. 9-11 illustrate example signaling schemes to implement a variable data frame length for SPC data transmissions, in accordance with one or more embodiments of the disclosure; and FIG. 12 illustrates an example signaling scheme to implement an alternate SPC trigger signal that includes a wake up signal, in accordance with one or more embodiments of the disclosure.

The example aspects of the present disclosure will be described with reference to the accompanying drawings. The drawing in which an element first appears is typically indicated by the leftmost digit(s) in the corresponding reference number.

SUMMARY

As discussed in further detail herein, SPC communication protocols are commonly used to support communications between different devices. For example, the SPC communication protocol may be implemented to facilitate communications between one or more secondary devices (e.g. sensors) and a primary device (e.g. a microcontroller, an ECU, etc.), depending upon the particular application. The SPC communication protocol is a known protocol that includes enhanced interface features based on the Single Edge Nibble Transmission (SENT) protocol. For instance, the SPC protocol may be implemented based on two different architectures: with an open drain or with a push-pull output stage.

Again, the SENT protocol is defined by the Society of Automotive Engineers (SAE) J2716 specification at the time of this writing. However, the SPC communication protocol introduces a Master Trigger Pulse (MTP) into the SENT frame definition, which acts as an address and assigns a unique time-encoded length to each sensor in terms of a multiple of a pre-programmed unit time (UT) value. This allows a single primary device to manage multiple secondary devices using the same wired interface, which can reduce costs compared to the original one-to-one SENT specification. A typical SPC-based communication system may include one or more sensors coupled to an ECU via a communication path. Thus, the SPC protocol may be implemented in accordance with a synchronous mode of operation (e.g. when a single sensor is connected to the ECU), or via a bus mode of operation (e.g. when more than one sensor is connected to the same ECU via the shared communication path).

Figure 1:
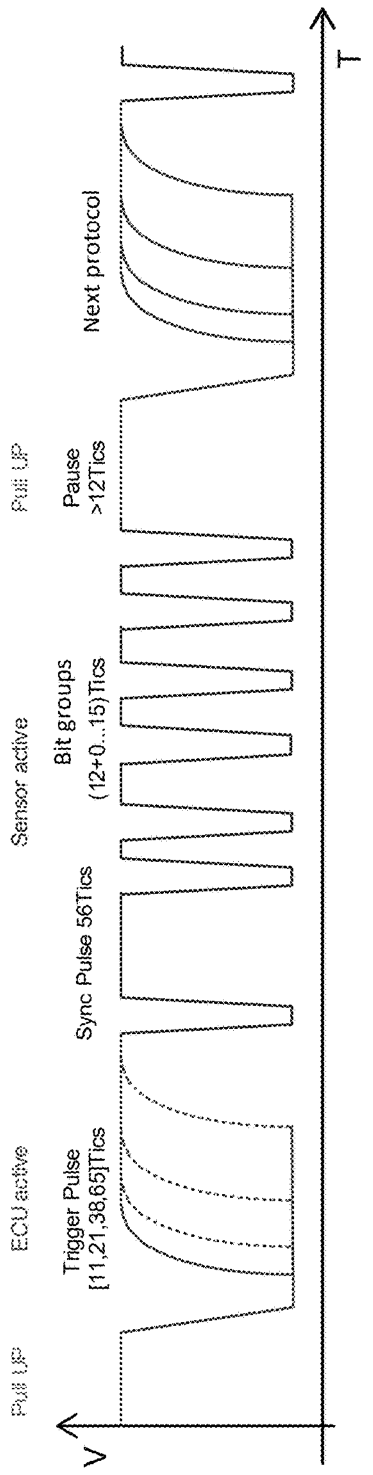
FIG. 1 Prior Art
FIG. 1 illustrates the time-varying state of a data line for conventional SPC communications.

For instance, FIG. 1 illustrates the time-varying state of a data line for conventional SPC communications. In this example, a trigger pulse is transmitted by an ECU via a data line, which may form part of a communication link. The ECU may do so, for example, by pulling down or otherwise driving the data line to a reference voltage (e.g. 0V), as shown in FIG. 1, for a specific amount of time based upon the data that is to be encoded, and then releasing the data line or otherwise driving the data line back to the pull up state, which is shown in FIG. 1 as a predetermined voltage level V. In other words, the ECU may generate the trigger pulse in accordance with a PWM scheme in which the length of the trigger pulse encodes a specific value.

That is, the trigger pulse has a duration, which is also referred to herein as a length, expressed in terms of a unit time also referred to as tics. The length of the trigger pulse is then measured by the sensors that receive the trigger pulse transmission. The trigger pulse therefore has a variable duration, which is a function of the intended data to be encoded. This encoded data may represent, for example, the address of a recipient sensor from which sensor data is being requested, and is measured by each sensor from the falling edge to the next rising edge, as shown in FIG. 1. That is, the trigger pulse length may encode data via a low time duration on the data line used for SPC communications, i.e. the time duration during which the ECU pulls the data line to a reference voltage (e.g. ground).

Again, the trigger pulse length may be expressed as a multiple of a pre-programmed unit time (UT) value, which is quantized using "tics" that are established by the ECU and each sensor as part of a clock synchronization process. This is a known part of the SENT and SPC protocols and is implemented by way of the sensor's sync pulse transmission as shown in FIG. 1, which has a predetermined duration of 56 tics in terms of the sensor's clock frequency. The ECU may then receive this sync pulse transmission and, as it has a known length of 56 tics, the ECU may calibrate its own reference clock frequency to match that of the sensor. In other words, the ECU may adjust its clock frequency such that the tic values implemented by the ECU match those of the sensor. The use of the quantized tic time values and the calibration/synchronization process allows for lower-cost clocks to be implemented as long as each device is aware of and provides a ±20% clock tolerance.

The trigger pulse length is thus shown in FIG. 1 as being 11, 21, 38, or 65 unit time (UT) values, or "tics," as are defined in accordance with the conventional SPC protocol. The tic time values are based upon the clock frequency of the relevant device, and typically represent values between 0.25 to 5 microseconds. The different UT values may function to identify the target recipient from which sensor data is being requested, with up to four sensors being supported, i.e. one for each of the different trigger pulse length values as shown. Each sensor may thus determine whether the ECU is requesting sensor data from that particular sensor by comparing the measured time duration of the trigger pulse to a predetermined range of time durations identified for each sensor. Thus, the trigger pulse enables each sensor to discriminate whether the ECU is requesting sensor data from that sensor or another sensor (in which case the trigger pulse may be ignored).

In other words, when used in the bus mode, the trigger pulse may enable the ECU to transmit two bit values as time-encoded data, which again is a function of the length of the trigger pulse. For instance, a trigger pulse having a length of 11 tics may represent 00, whereas trigger pulse lengths of 21, 38, and 65 tics may represent 01, 10, and 11, respectively. These different trigger pulse lengths may be used as bus addresses (as noted above), or to encode other data such as configuration data. Thus, the different trigger pulse lengths used in this manner may be referred to as encoding different bus codes. Each sensor's SPC ID register may comprise a 2-bit value that is normally programmed into its EEPROM to enable each sensor to determine whether the measured trigger pulse duration, when decoded, matches (within a tic tolerance, typically 20%) this locally-stored ID, indicating that sensor data is being requested from that sensor or whether a specific configuration has been requested. In the SPC synchronous mode of operation, the trigger pulse only uses a short (e.g. 11 tics) low time and does not transmit any information.

The use of the variable length trigger pulse for the bus mode of operation represents an enhancement from the SENT protocol, as this allows a form of communication from the ECU to the sensors that is not implemented in the purely unidirectional SENT protocol, which in contrast only allows the ECU to receive data from the sensors. However, although the SPC communication protocol enables such additional features compared to the SENT protocol, the SPC communication protocol still has various drawbacks as noted above.

The embodiments discussed herein address these issues by enhancing the established SPC communication protocol in various ways to provide further flexibility for various applications while improving performance. For instance, the embodiments as described in further detail in Section I describes a trigger signal that may be implemented to replace the standard trigger pulse used for conventional SPC communications. The trigger signal may encode a time base reference of the primary device as well as state data (e.g. an address, configuration data, etc.), which is transmitted to one or more secondary devices. The transmission of the time base reference enables secondary devices receiving the trigger pulse to then decode the encoded state data. As a result, a higher granularity of state data transmission encoding is achieved to facilitate a larger number of individual states to be represented, with each state being encoded by a smaller number of tic values than that required for the conventional SPC communication protocol, which generally only supports 4 different state encodings (e.g. bus codes) as noted above with respect to FIG. 1. The transmission of the time base reference also allows the secondary devices to adapt their time base to that of the primary device when performing their data transmission, obviating the need to transmit a sync pulse as is required for the conventional SPC communication protocol.

Section II describes the use of an end-of-frame (EoF) signal that may be introduced into an SPC communication data frame to enable the use of a variable data frame length. That is, the conventional SPC communication protocol is limited to a predetermined number of bit groups (e.g. nibbles) per data frame transmission, such as 6 for example. The EoF signal allows for a device to continue to receive additional data bit groups until the EoF signal is received. The EoF signal may comprise a length of time that is outside a predetermined range of time that is defined in accordance with the conventional SPC protocol to enable a device to differentiate the received EoF signal from other SPC data transmissions.

Section III describes the use of another alternate trigger signal that may be implemented to replace the standard trigger pulse used for conventional SPC communications. The trigger signal may include a wake up signal having a predetermined length of time that is recognized by a secondary device, which causes the secondary device to transition from a low power mode to an active mode of operation. The trigger signal may also include a state signal that may encode a specific function, instruction, command, etc., in accordance with the duration of the state signal. Thus, the state signal may encode different states based upon respective durations of time expressed as tic values, as is the case for the SPC protocol trigger pulse. However, the use of the separate wake up signal allows for the state signal to encode additional states when operating in the synchronous mode of operation, which facilitates additional flexibility for specific applications which may require the use of additional functions, instructions, commands, etc.

Detailed Description

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Again, the embodiments herein are presented in three separate Sections for ease of explanation. Section I is directed to the use of an alternative trigger signal that may encode a time base reference of the primary device as well as state data. Section II is directed the use of an end-of-frame (EoF) signal that may be introduced into an SPC communication frame to enable the use of a variable data frame length. Section III is directed to use of another alternate trigger signal that may include a wake up signal and a state signal.

Although the embodiments are discussed separately in each Section, it is noted that any of the embodiments described in any of the Sections may be combined with one another, and any of the architectures, processes, types of communications, algorithms, statements, etc., described with respect to the embodiments of any of the Sections are also applicable to the embodiments described in any of the other Sections. For example, any of the embodiments as described herein with respect to the alternative trigger signal of Section I may optionally be implemented in conjunction with the use of the EoF signal described in Section II, as further discussed below.

Additionally, the various embodiments are discussed herein with respect to the use and/or modification of the SPC communication protocol. However, although the embodiments as discussed herein may be implemented in accordance with SPC protocols, the embodiments as discussed herein are not limited to a specific type or definition of a specific type of communication protocol. The embodiments as discussed herein may be implemented in accordance with any suitable type of communication protocol, such as those that utilize PWM-based encoding for communications. Such protocols may be referred to herein as PWM code protocols, and may implement the measurement of time lengths that are varied between one or more edges of a transmitted signal to encode data values based upon a correlation of predetermined time durations to predetermined data values. Such PWM code protocols may encompass the SENT protocol and SPC protocol as of the time of this writing, but may additionally or alternatively encompass any other suitable communication protocols that implement PWM-based encoding that may deviate in one or more ways from the SENT and the SPC protocols as of the time of this writing.

Figure 2:
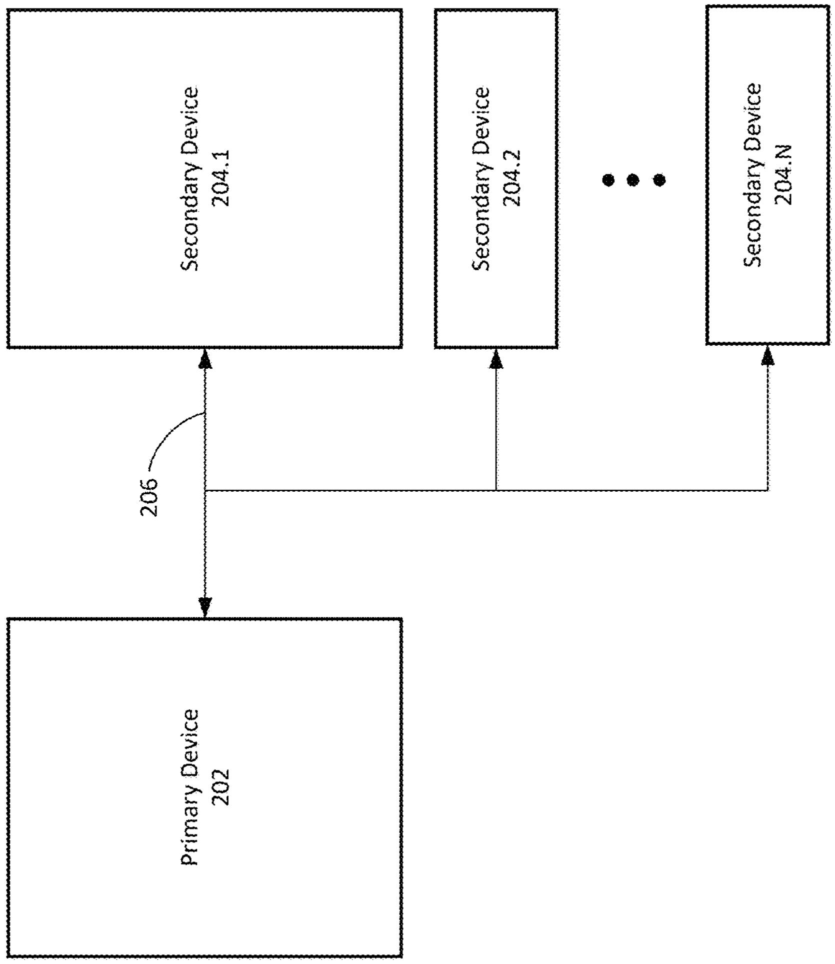
FIG. 2 illustrates an example communication system, in accordance with one or more embodiments of the disclosure.

FIG. 2 illustrates an example communication system, in accordance with one or more embodiments of the disclosure. The communication network 200 as shown in FIG. 2 includes a primary device 202 and any suitable number N of secondary devices 204.1-204.N. The primary device 202 and the secondary devices 204.1-204.N may be communicatively coupled to one another via the communication links 206, which may comprise a communication path and represent any suitable number and/or type of communication links to facilitate the transfer of data in accordance with any suitable number and/or type of communication protocols. For instance, the communication links 206 may comprise wired and/or wireless links, buses, wires, cables, conductive traces, optical connections, etc.

The primary device 202 may be implemented as any suitable type of device, which may perform bidirectional and/or unidirectional communications with each of the secondary devices 204.1-204.N in accordance with any suitable number and/or type of communication protocols. For example, the primary device 202 may be implemented as a microcontroller, a host device, an electronic control unit (ECU), etc. The secondary devices 204.1-204.N may likewise be implemented as any suitable type of device, which may perform bidirectional and/or unidirectional communications with the primary device 202 in accordance with any suitable number and/or type of communication protocols. For example, the secondary devices 204.1-204.N may be implemented as any suitable type of sensors, each being configured to generate sensor data in accordance with respective measurements of physical values such a magnitude and/or direction of a magnetic field, an applied force, internal angle information to count quadrants or octants (e.g. when implemented as a turns counter), a measured angle or measured torque of a rotatable shaft, a temperature, a liquid level measurement, humidity, etc.

Again, the primary device 202 and each of the secondary devices 204.1-204.N may communicate with one another via the communication links 206 using any suitable number and/or type of communication protocols. Such communication protocols may include, for instance, SPC communication protocols, which may include the various enhancements to the SENT protocol as well as further enhancements as discussed herein. Thus, the communication links 206 may comprise wires implemented in accordance with SPC protocols, such as a GND, VDD, and DATA wires. Additionally or alternatively, when communicating via an SPC communication protocol, the primary device 202 and each of the secondary devices 204.1-204.N may communicate with one another via a synchronous mode of operation (e.g. when only one secondary device 204.1-204.N is present) or via a bus mode of operation (e.g. when more than one secondary device 204.1-204.N is present).

Except as otherwise noted herein, the primary device 202 and each of the secondary devices 204.1-204.N may communicate with one another in accordance with any aspects of the SPC communication protocols and/or the SENT communication protocols, such as those discussed above for instance. This may include, for example, the use of PWM encoding for the various types of data described in further detail herein, which encodes data in terms of a measured signal length. For instance, the SPC communication protocol may include the use of data transmitted as a series of data bit groups, each including a time-encoded value representing four bits or less bits, as is the case for the SENT protocol. The embodiments as discussed herein may thus implement any suitable number of bits to encode the data bit groups. For instance, the data bit groups may comprise data nibbles of four bits as defined in accordance with the SENT protocol or any other suitable communication protocol. As another example, the data bit groups may comprise a lesser number of bits, such as 3 or less for example.

The communication network 200 may comprise any suitable combination of secondary devices 204.1-204.N, which may have the same capabilities or varying capabilities depending upon the particular application. For instance, the primary device 202 and one or more of the secondary devices 204.1-204.N may communicate with one another using a conventional SPC communication protocol. This may include the transmission of the trigger pulse by the primary device 202, as discussed above with respect to FIG. 1, which causes the target recipient secondary device 204.1-204.N to then transmit a sync pulse to the primary device 202, which again may include sensor data that is PWM-encoded in bit groups as discussed above. This mode of operation may be referred to herein as a standard or default communication mode, and may include the use of any of the aspects of the SENT and/or SPC protocols as discussed above to facilitate such communications. The secondary devices 204.1-204.N that are configured to only operate in accordance with the standard mode of communications may be referred to herein as standard secondary devices or standard sensors.

As another example, the primary device 202 and one or more of the secondary devices 204.1-204.N may additionally communicate with one another using an alternative communication mode, which may include the modification of any suitable aspects of the SENT and/or SPC protocols as discussed in greater detail in any of the Sections herein. Such secondary devices 204.1-204.N may also be configured to communicate with the primary device 202 in accordance with the standard communication mode. Thus, the primary device 202 and the secondary devices 204.1-204.N that are configured to operate in accordance with the standard and alternative communication mode may be referred to herein as enhanced or upgraded devices. In other words, upgraded devices may also communicate in the alternative communication mode by recognizing, interpreting, and responding to various signaling schemes that are initiated by the primary device 202 or the secondary devices 204.1-204.N, as the case may be, as such signaling schemes may deviate from and/or violate those defined by the SENT and/or SPC communication protocol. As a result, standard devices may simply not recognize the new signaling schemes as discussed in further detail herein and ignore such signals, allowing the communication network 200 to include a combination of both standard and upgraded secondary devices 204.1-204.N. The various signaling schemes used in accordance with the alternative mode of communications are discussed in greater detail below in each of Sections I-III.

Figure 3:
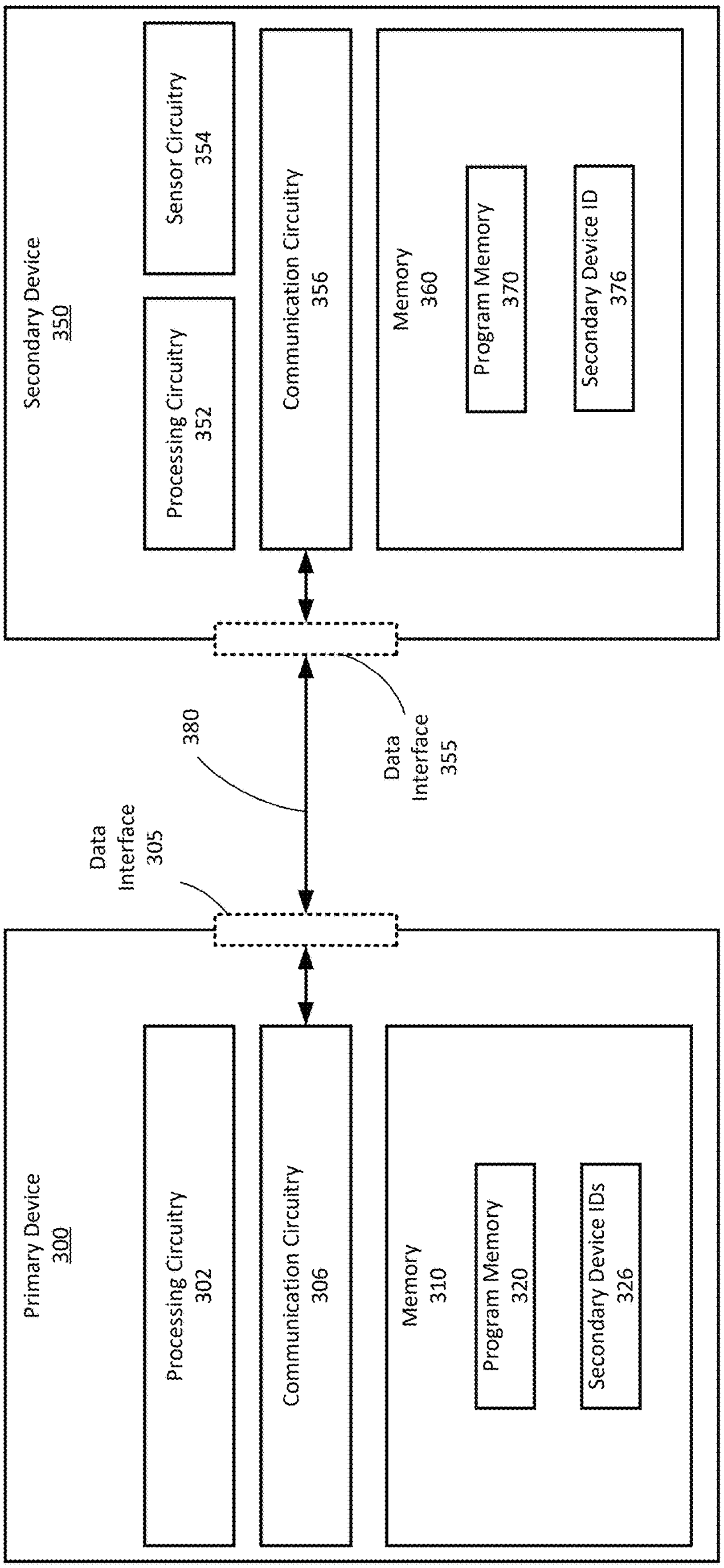
FIG. 3 illustrates additional detail with respect to the example communication system as shown in FIG. 2, in accordance with one or more embodiments of the disclosure.

Reference is now made to FIG. 3, which illustrates additional detail with respect to the example communication network 200 as shown in FIG. 2, in accordance with one or more embodiments of the disclosure. The primary device 300 may be identified with the primary device 202 as shown in FIG. 2, and the secondary device 350 may be identified with any one of the secondary devices 204.1-204.N as shown in FIG. 2. The communication links 380 may be identified with the communication links 206 as shown in FIG. 2, which again may represent a communication path. Thus, the primary device 300 and the secondary device 350 may communicate with one another as discussed in further detail herein via the communication links 380, which may include the use of a bidirectional SPC communication protocol for instance. Although the embodiments are described herein with respect to the primary device 300 and the single secondary device 350, this is for ease of explanation and not limitation, and the primary device 300 may communicate with any of the secondary devices 204.1-204.N in the same way as described herein with respect to the secondary device 350.

The primary device 300 may include processing circuitry 302, communication circuitry 306, and a memory 310. The secondary device 350 may likewise include processing circuitry 352, communication circuitry 356, and a memory 360, which may be configured to operate in a similar manner as the processing circuitry 302, communication circuitry 306, and memory 310, respectively, of the primary device 300, as further discussed below, excepting for other differences in their operation as discussed herein. For instance, the secondary device 350 may additionally include sensor circuitry 354, which may include any suitable number and/or type of sensors and/or sensor elements. Thus, the sensor circuitry 354 may be configured to generate sensor data or other suitable data in accordance with any suitable physical measurement that is based upon the configuration and type of the secondary device 350. The sensor data generated via the sensor circuitry 354 may be transmitted to the primary device 300 in accordance with the SPC communication protocol for example.

Figure 4:
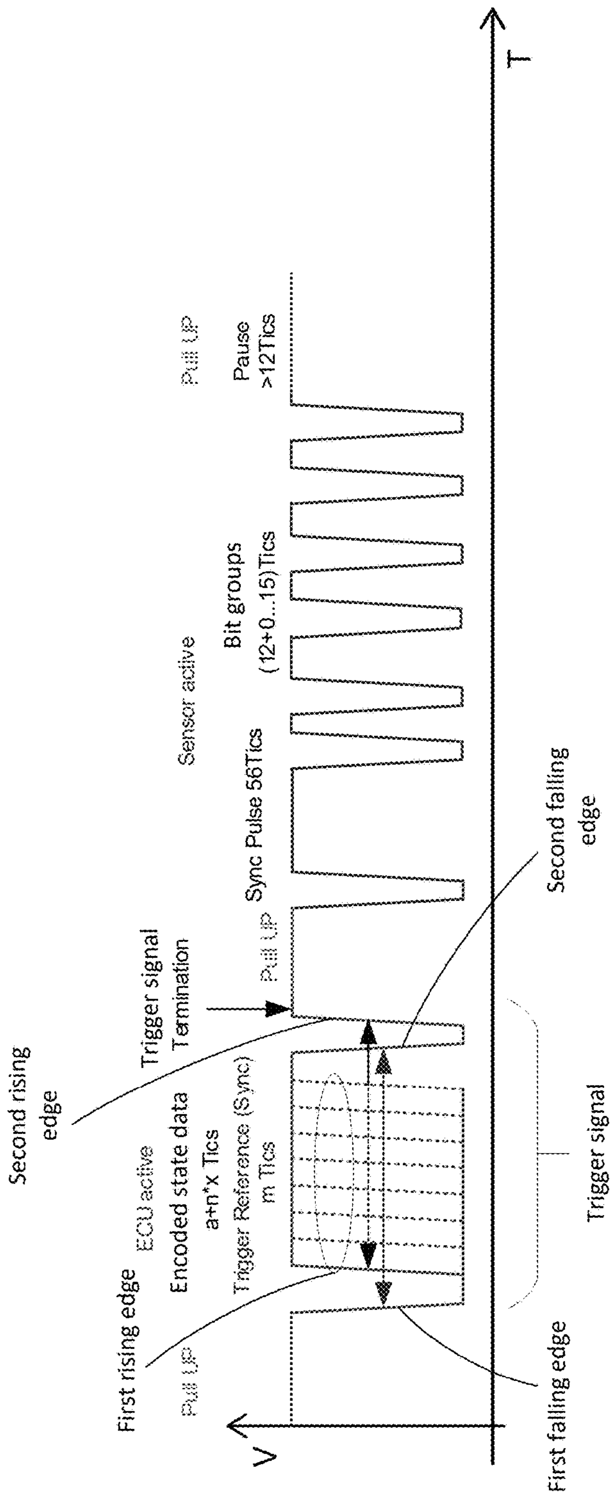

Each of the primary and secondary devices 300, 350 may include additional, fewer, or alternate components than those shown in FIG. 4, which are provided by way of example and not limitation. For instance, the memory 310, 360 of the primary and secondary devices 300, 350 may include one or more different types of memory such as non-volatile memory (e.g. an EEPROM), volatile memory, etc. The program memories 320, 370, the secondary device IDs 326, and/or the secondary device ID 376 may be stored in their respective memories 310, 360. Moreover, although shown as separate components, any of the components of the primary and secondary devices 300, 350 may be integrated or otherwise combined with one another.

The processing circuitry 302, 352 may comprise any suitable number and/or type of hardware components. For instance, the processing circuitry 302, 352 may be implemented as any suitable number and/or type of dedicated hardware components such as a microcontroller, an application specific integrated circuit (ASIC), a field programmable gate array (FPGA), a system on a chip (SoC), dedicated logic and/or other circuitry, a multi-processing unit (MPU), an application processing unit (APU), a hardware-based state machine, etc. The processing circuitry 302, 352, and the program memories 320, 370 are illustrated in FIG. 4 as separate components. However, this is for ease of explanation, and it is understood that the processing circuitry 302, 352 and the program memories 320, 370, respectively, may, in some embodiments, comprise a single component.

The embodiments as described in further detail herein may be implemented via software, hardware, or combinations of these. For example, the processing circuitry 302, 352 may be implemented as one or more processors and/or cores, which may execute computer-readable instructions stored in the respective program memories 320, 370 to perform any of the various functions as discussed in further detail herein. Alternatively, the embodiments described in further detail herein may be implemented via the processing circuitry 302, 352 of each respective device 300, 350 in accordance with hardware-based implementations.

The communication circuitries 306, 356 may be implemented as any suitable hardware components that enable communications between the primary and secondary devices 300, 350, as further discussed herein, via the data interfaces 305, 355 and the communication links 380. Thus, the communication circuitries 306, 356 may facilitate communications by transmitting (e.g. via voltage modulation) and receiving data (e.g. SPC frames) in accordance with any suitable number and/or type of communication protocols, such as those discussed herein. To do so, the communication circuitries 306, 356 may comprise hardware components, software components, or combinations of these, which are typically associated with components configured to perform such data communications.

For example, the communication circuitries 306, 356 may comprise any suitable number of ports, drivers, open drain or push-pull output stage architectures used in accordance with SPC communications, transmit and/or receive buffers, switches, etc. Additionally or alternatively, the communication circuitries 306, 356 may comprise any suitable number and/or type of dedicated hardware components such as a microcontroller, an application specific integrated circuit (ASIC), a field programmable gate array (FPGA), a system on a chip (SoC), dedicated logic and/or other circuitry, a multi-processing unit (MPU), an application processing unit (APU), a hardware-based state machine, etc. The communication circuitries 306, 356 may be implemented as one or more processors and/or cores, which may execute computer-readable instructions stored in the respective program memories 320, 370 to perform any of the various functions as discussed in further detail herein. The communication circuitries 306, 356 may be separate components or integrated as part of their respective processing circuitries 302, 352, in various embodiments.

Although referred to herein as "circuitry," the processing circuitry 302, 352 and/or the communication circuitry 306, 356 may perform their respective operations as discussed herein using software, hardware, or combinations of these. For instance, any of the operations performed to implement the communications as discussed herein may be performed via the processing circuitry 302, 352 and/or the communication circuitry 306, 356 executing instructions stored in their respective program memories 320, 370, as dedicated hardware components, or as combinations of these.

The data interfaces 305, 355 may be configured to facilitate the transmission and/or reception of data in accordance with any suitable protocols. In an embodiment, each of the data interfaces 305, 355 may represent a physical layer and the accompanying data interfaces used in accordance with any suitable communication protocol and/or standard, such as SPC for example. Additionally or alternatively, the data interfaces 305, 355 may represent any suitable hardware that couples the primary and secondary devices 300, 350 to the communication links 380, such as terminals, pins, ports, etc.

In addition to the program memories 320, 370, the memory 310 may store secondary device IDs 326, whereas the memory 360 may store the secondary device ID 376. The secondary device IDs 326 may comprise an identification of each unique secondary device ID (e.g. a 2-bit value) with which the primary device 300 is configured to communicate. The processing circuitry 302 may access the secondary device IDs 326 to determine how to construct a trigger signal transmission for an intended secondary device, as discussed in further detail herein. The secondary device ID 376 may comprise an identification of the secondary device ID (e.g. a 2-bit value) with which the primary device 300 is configured to communicate. As noted above, the secondary device ID 376 may uniquely identify the secondary device 350 among several other secondary devices that communicate with the primary device 300. The processing circuitry 352 may access the secondary device ID 376 to determine whether a received trigger signal is intended for the secondary device 350 in accordance with the decoded value of the trigger signal or other received data, as discussed in further detail herein. Of course, this may not be required when an addressing scheme is not utilized due to the trigger signal encoding state data instead of an address, as discussed in further detail below.

A number of example signaling schemes used in accordance with the alternative mode of communications are discussed in further detail in each of the Sections I-III. Each of these signaling schemes are discussed with respect to modulating the voltage of any suitable portion of a communication path that is used to communicatively couple the primary and secondary devices 300, 350 to one another. The signaling schemes are thus shown in the following Figures referenced in Sections I-III in terms of a timeline T, and thus the signals as shown progress temporally from left to right, with the leftmost part being shown as occurring first, and the modulation of the data line moving towards the right occurring subsequent in time. For instance, the communication link 380 may include high and low reference voltage lines (e.g. buses or wires), which may be denoted as V (e.g. 3V, 5V, etc.) and GND (e.g. 0V). The communication link 380 may also include a DATA line (e.g. a bus or wire), which has a voltage level that may be modulated (by the first and the secondary devices 300, 350) between the high and low reference voltage values associated with the high and low reference voltage lines, respectively.

The voltage level of the DATA line may thus be controlled by either the primary or the secondary device 300, 350 in different ways and at different stages of communications, as discussed in further detail below. This may be enabled, for example, via the communication circuitry 306, 356 and data interfaces 305, 355 of the respective first and secondary devices 300, 350, which again may comprise any suitable combination of hardware components to do so (e.g. an open drain, a push-pull output stage, etc.), including known components used for this purpose. The embodiments as further discussed below may be provided with respect to the voltage state of the DATA line, for example, by way of example and not limitation. As discussed in further detail below, the primary device 300 may modify any suitable portions of the SPC protocol in a predetermined manner that is recognized by the secondary device 350, and vice-versa.

In each of the Figures referenced in Sections I-III, the communications between the primary and the secondary devices 300, 350 may be denoted as "ECU active" and "sensor active," respectively. However, this is by way of example and not limitation and, as noted above, the primary and the secondary devices 300, 350 may be implemented as any suitable type of device. Furthermore, in each of the Figures referenced in Sections I-III, the primary and secondary devices 300, 350 are described as performing various communicative actions, including the modulation of the state of the DATA line as shown. In each of these scenarios, unless otherwise noted, such communicative actions may be performed by the primary device 300 via the data interface 305 and/or the communication circuitry 306, and may be performed by the secondary device 350 via the data interface 355 and/or the communication circuitry 356. Such communicative actions may include the primary and secondary devices 300, 350 transmitting and receiving data from one another, measuring signal parameters such as a signal duration, decoding data encoded in received signals, taking corresponding actions in response to decoding such data, etc., as further described herein.

Section I: An SPC Trigger Pulse with Increased Resolution and Reference Time Base Delivery FIGS. 4, 5A-5B, and 6-8 illustrate example signaling schemes implemented by a device and a corresponding time-varying state of a data line to implement an SPC trigger pulse with increased resolution and reference time delivery, in accordance with one or more embodiments of the disclosure. These signaling schemes may be used, for example, to replace the trigger pulse that is transmitted in accordance with the standard SPC communication protocol as shown in FIG. 1, for instance, with a trigger signal.

Referring first to FIG. 4, the communication circuitry 306 is configured to transmit a trigger signal over the communication path by way of the modulation of the DATA line as shown, which functions to initiate communication with the secondary device 350 in accordance with the SPC communication protocol. The trigger signal encodes state data with respect to the secondary device 350 as well as a time base reference of the primary device 300. Again, the trigger signal as shown in FIG. 4 may replace the transmission of the trigger pulse that is typically transmitted in accordance standard SPC communication protocol as shown in FIG. 1 for instance.

However, and as discussed in further detail below, the trigger signal may have a shape that differs from the standard SPC trigger pulse. For instance, and as further discussed below with respect to each of FIGS. 4, 5A-5B, and 6-8, the trigger signal may have any suitable number of edges, each having a respective direction. That is, and as discussed in further detail below, the trigger signal may include one or more rising edges and one or more falling edges. The rising edges may be identified as having one direction, e.g. a slope having a temporal direction that defines such edges as transitioning from a lower to a higher voltage value. Each of the rising edges of the trigger signal may be considered as having the same direction as one another, excepting for driver and/or timing tolerances. The falling edges may be identified as having another, different direction, e.g. a slope having a temporal direction that defines such edges as transitioning from a higher to a lower voltage value. Each of the falling edges of the trigger signal may also be considered as having the same direction as one another, excepting for driver and/or timing tolerances. Thus, the rising and falling edges may alternatively be described herein as edges having a specific direction, with the rising edges having the same direction as one another and the falling edges having another, different direction that is the same as one another, but is different than the direction of the rising edges.

For example, the trigger signal as shown in FIG. 4 includes four edges, which as shown includes two rising edges and two falling edges. That is, the trigger signal has a shape that begins with a first (fixed) falling edge, transitions to a first (variable) rising edge, transitions to a second (fixed) falling edge, and finally transitions to a second (fixed) rising edge, which represents the entirety of the trigger signal as shown in FIG. 4. Thus, for the example shown in FIG. 4, the overall duration of the trigger signal may be fixed per transmission (e.g. from the first falling edge to the second rising edge), and may exceed the maximum trigger pulse length defined in accordance with the SENT and/or SPC communication protocols (e.g. 65 tics or an upper range of this encoded bus code). Moreover, the duration of time between the first and the second falling edge is likewise fixed in duration, and functions to encode the time base reference of the primary device 300, as discussed in further detail below.

However, the duration of time between the two rising edges, which is used to encode the state data, may be a variable duration that is a function of the specific state data that is intended to be conveyed to the secondary device 350. Thus, the state data may be encoded in a similar manner as the use of the different bus codes, i.e. via the different PWM-encoded time lengths of 11, 21, 38, or 65 tics used in the standard SPC communication protocol, as discussed above with respect to FIG. 1. Thus, the state data may be encoded in the trigger signal as one of several different PWM time-encoded values represented as different predetermined lengths of time, each representing a different state to be transmitted to the secondary device 350.

The state data that is encoded in this manner may represent any suitable information that is to be transmitted to the secondary device 350. That is, and as noted above with respect to the use of the data bit groups transmitted by the secondary device 350, the encoded state data may define a bit value based upon the number of states that are in an overall set of state data for a particular application. Thus, the state data may represent an encoded number that is based upon the number of bits that may be encoded per state. As an illustrative example, the number of states may include 8 states, which may encode up to 8 different three bit values, 16 states, which may encode up to 16 different four bit values, etc. Thus, the state data may be encoded using a PWM encoding scheme by varying a temporal position between two of the four edges of the trigger signal as discussed herein, such that each state represents a different encoded value in terms of a number of bits that is a function of the number of overall set of state data that may be encoded.

For instance, the state data may represent a sensor address that is used by each receiving sensor to determine whether sensor data is being requested from that particular sensor, as noted above. Additionally or alternatively, the state data may represent a value representing bit values that define sensor configuration data to instruct a sensor with respect to the manner of its operation, how sensor measurements are to be performed, a frequency of transmission, etc. The state data is not limited to such examples, and may represent any suitable instruction, command, etc., which is recognized by the secondary device 350 and, in response, causes a predetermined response by the secondary device 350. In any event, the processing circuitry 302 is configured to first generate the state data based upon the particular instruction, command, data, etc., that is to be conveyed to the secondary device 350. This may include, for instance, the processing circuitry requesting sensor data, determining that a sensor needs a specific configuration during startup, etc.

Moreover, and in contrast with the conventional SPC communication protocol trigger pulse, the trigger signal also encodes the time base reference of the primary device 300. To do so, the processing circuitry 302 is configured to generate (e.g. calculate) the time base reference for the primary device 300 based upon a clock frequency of the primary device 300, which is typically a more accurate clock compared to that of the secondary device 350. The processing circuitry 302 may generate the time base reference in terms of any suitable number 'm' of unit time values, or tics, as shown in FIG. 4. This may be performed, for example, in the same manner as the secondary device 350 when transmitting the sync pulse in accordance with the SPC communication protocol.

For example, the processing circuitry 302 may calculate a tic value as a proportion of and/or with reference to a clock frequency that is used for communications. As an illustrative example, the processing circuitry 302 may calculate the tic value in terms of a time of one or more clock cycles of the clock frequency. The time base reference may thus be expressed as a single tic value, and the processing circuitry 302 may encode the time base reference of the primary device 300 in terms of duration of time that is a predetermined multiple of these tic values. For example, like the use of the 56 tics for the standard SPC communication protocol, the number 'm' of tics used to encode the time base reference of the primary device 300 may also be fixed and known (e.g. pre-programmed into) the primary and secondary devices 300, 350.

Thus, the trigger signal encodes the time base reference of the primary device 300 and the state data by modulating the DATA line to have a specific shape over time. Thus, the time base reference of the primary device 300 data may also be encoded using a PWM encoding scheme by varying a temporal position between two of the four edges of the trigger signal as discussed herein. Again, in the present example, the durations of time between the falling and rising edges function to encode the time base reference of the primary device 300 and the state data for the secondary device 350, respectively. Again, this encoding may be achieved, for example, via the communication circuitry 306 modulating the state of the DATA line between the higher and the lower voltage values as shown in FIG. 4.

The encoding of the time base reference of the primary device 300 in this manner enables the secondary device 350 to decode the encoded state data using the higher accuracy clock of the primary device 300 as a time base reference. For example, the secondary device may use the encoded time base reference to measure the time between the two rising edges relative to the reference time between the two falling edges to derive the encoded state data based upon the more accurate clock of the primary device 300. As an illustrative example, the secondary device 350 may be configured to recognize (e.g. via pre-programming) that the encoded time base reference of the primary device 300 has a duration of 50 tics in terms of the time base reference of the primary device 300. Thus, if the duration of time between the two falling edges of the trigger signal measures 100 microseconds, then the secondary device 350 may identify the time base reference of the primary device 300 as 1 tic=2 microseconds. The secondary device 300 may then measure the time between the two rising edges of the trigger signal, which again encodes the state data, to decode the state data in terms of the time base reference of the primary device 300 that was derived from the encoded time base reference in the trigger signal. For instance, and continuing this example, if the time between the two rising edges of the trigger signal is measured as 16 microseconds, then the secondary device 350 may determine that the encoded state data represents 8 tics in length, and correlate the 8 tic value to a predetermined instruction, command, state, address, etc., based upon the particular application.

Thus, the reliance on the more accurate clock of the primary device 300 in this manner facilitates the use of a higher granularity trigger pulse, which allows for the state data to be encoded using a smaller number of tics than that defined in accordance with the conventional SPC communication protocol. Additionally, the separation between the different predetermined lengths used to define different states may also be reduced, as the typical 20% clock tolerance of the secondary device clock is no longer used as a time base reference, as the more accurate clock of the primary device 300 now defines the time base reference of the primary device 300 that is used by the secondary device 350. For example, and as shown in FIG. 4, the state data may be encoded using a first rising edge that is offset a duration 'a' from the first falling edge of the trigger signal. Again, the temporal position of the second rising edge is fixed irrespective of the sensor state data that is encoded in the trigger signal. Thus, the sensor state data may encode any suitable number of 'n' states by varying the position of the first rising edge with respect to the second rising edge. That is, the communication circuitry 306 may be configured to modulate the DATA line to vary a temporal position of the first rising edge by a predetermined time period with respect to the second rising edge to encode each one of a set of state data. Each state (in the set of state data) is thus encoded as a predetermined duration of time from the second rising edge, and is represented in terms of 'x' tics with respect to the primary device 300 time base. In other words, the variable first rising edge may be temporally shifted within the trigger signal by a+(n*x) tic values depending upon the particular state to be encoded, with x tics representing the duration of each time-encoded state n.

In this way, each of the n states may be encoded via a smaller number of tic values (x) than those implemented for a conventional SPC communication protocol trigger pulse, given the use of the higher accuracy clock of the primary device 300 as the time base reference. Therefore, the trigger signal may encode additional states compared to the conventional SPC communication protocol trigger pulse for a trigger signal having the same duration, i.e. more states may be transmitted with a single trigger signal having the same duration as a standard SPC trigger pulse. As an additional benefit, the trigger signal may alternatively be reduced in length to encode the same (or even more) states as the conventional SPC communication protocol trigger pulse, thereby facilitating a shorter trigger signal length for the same amount (or even more) different states that may be transmitted. As yet another added benefit of this signaling scheme, in the example shown in FIG. 4, the measurement via the secondary device 350 of the encoded state data and the encoded time base reference of the primary device 300 are respectively performed between equal direction edges. Thus, inaccuracies due to different driver capability on the high and low voltage sides are removed, in contrast with the conventional SPC communication protocol trigger pulse that is measured from the first falling edge to the next rising edge.

Again, in the example shown in FIG. 4, the trigger signal may replace the use of the conventional SPC trigger pulse to deliver the time base reference of the primary device 300 and state data to the secondary device 350. In the present embodiments, the secondary device 350 may receive the trigger signal, decode the state data as noted above, but otherwise not utilize the encoded time base reference to calibrate its own clock. Thus, other than the initial transmission of the trigger signal as shown in FIG. 4, the primary device 300 and the secondary device 350 may then communicate with one another in the same manner as defined in accordance with the conventional SPC communication protocol.

For instance, the secondary device 350 may respond to the received trigger signal by transmitting the sync pulse as shown, which includes the time base reference of the secondary device 350. The primary device 300 may then use the sync pulse, which again has a predetermined duration of 56 tics as shown, to calibrate its own reference clock frequency to match that of the secondary device 350, as discussed above. That is, the sync pulse has a defined length in terms of the secondary device 350 time base, which is referenced from the secondary device 350 clock frequency, is expressed as a length of 56 tics, and is received by the primary device 300. The primary device 300 measures the length of the 56 tic sync pulse to derive the time base of the secondary device 350 and then calibrate the time base of the primary device 300 to match that of the secondary device 350. For example, the primary device 300 may measure the length of the sync pulse and determine that the 56 tics used by the secondary device 350 are 10% higher, 5 % lower, etc., than that of the clock implemented by the primary device 300 used to define the time base of the primary device 300. Thus, upon calibrating the time base reference at the primary device 300, the primary device 300 may adjust its clock frequency to ensure that the time base of the primary and the secondary devices 300, 350 are synchronized with one another (e.g. the tic values match) despite deviations between the clocks used at each device.

The secondary device 350 may then, in response to receiving the trigger signal, also transmit data (e.g. sensor data) to the primary device 300, which may occur in accordance with the conventional SPC communication protocol for instance. For example, this may include the secondary device 350 transmitting the bit groups as shown, which may encode any suitable data using a timing and voltage that complies with the conventional SPC communication protocol. In this example, the PWM encoding of the data bit groups in this manner utilizes the time base of the secondary device 350. The data bit groups may represent four or less bits based upon the particular application. For instance, each of the data bit groups may encode four bits, and in such a case be referred to as data nibbles. However, for other applications, a reduced number of bits may be encoded per PWM cycle. In accordance with such applications, the data bit groups may encode less than four bits, such as three bits for instance.

In any event, the time between two consecutive falling edges of each transmitted data bit group may define an N-bit value (with N being 4 or less), and thus may represent an encoded number between 0 and 15 when four bits are encoded, between 0 and 7 when 3 bits are encoded, etc. The transmission time (i.e. the time during which the data line remains low) for each data bit group therefore depends on the transmitted encoded data values. All values are multiples of the UT (i.e. tic) value, which again is known by the primary and secondary devices 300, 350 via the use of the time base reference synchronization processes as discussed in further detail herein (which may be performed via either of the primary or the secondary devices 300 350, in various embodiments).

Again, in the present embodiment, the primary device 300 may calibrate its clock frequency as noted above to match that of the secondary device 350, and then use this calibrated clock frequency to receive and decode the data that is encoded in the transmitted bit groups. This time base synchronization process is described above with respect to the primary device 300, which is part of the conventional SPC communication protocol and is generally known. However, in the embodiments described in further detail below, the clock calibration process may alternatively be performed via the secondary device 350 using the time base reference encoded in the trigger signal transmitted by the primary device 300. That is, the time base reference encoded as part of the trigger signal as discussed above with respect to FIG. 4 enables the secondary device 350 to calibrate its own clock frequency in the same manner that is typically performed by the primary device 300 in accordance with the conventional SPC protocol.

Figure 5A:
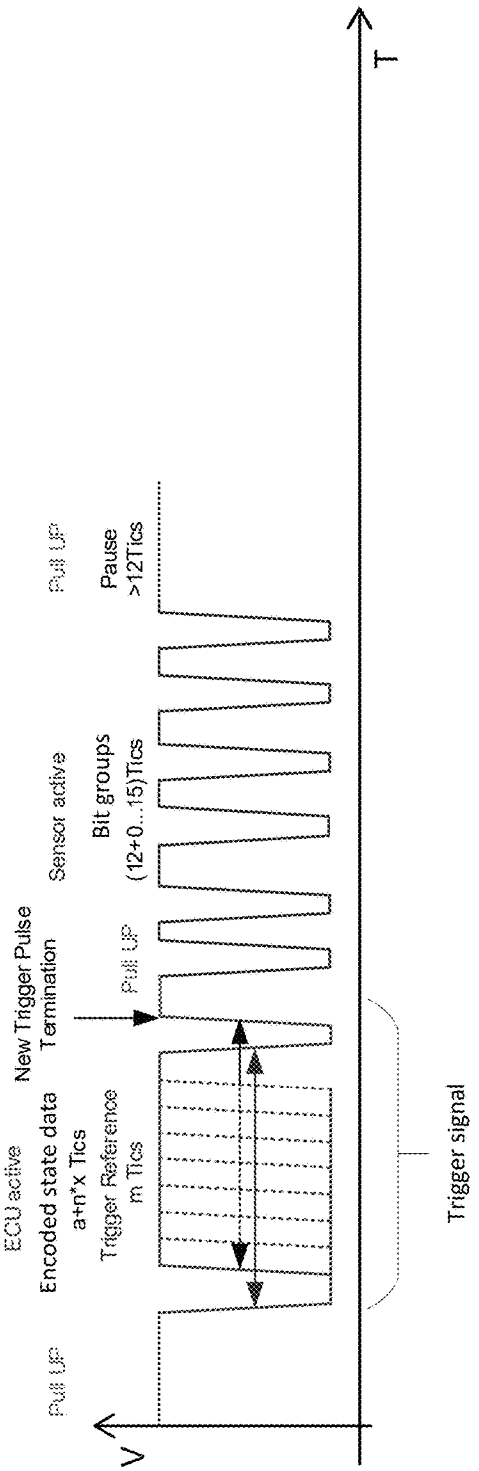
Figure 5B:
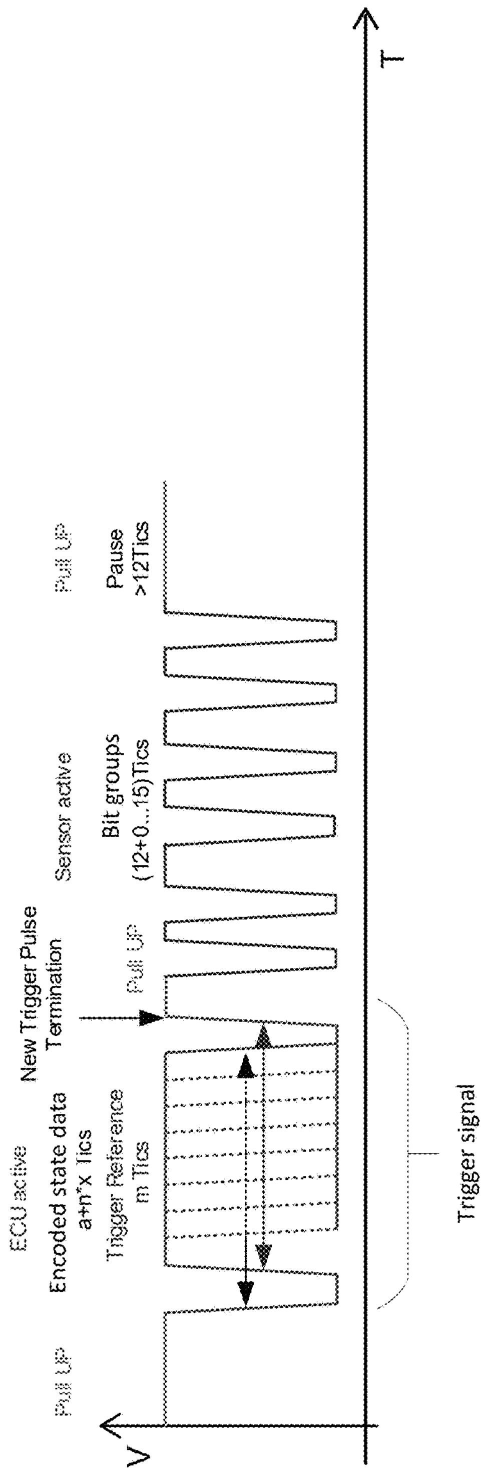

As a result, when the secondary device 350 calibrates its own clock frequency in this manner, the secondary device 350 need not transmit a sync pulse to the primary device 300, as shown in the signaling scheme illustrated in FIGS. 5A-5B. For example, FIG. 5A illustrates the same signaling scheme as shown in FIG. 4, except that in this scenario the primary device receives the data encoded in the bit groups transmitted from the secondary device 350 without receiving any synchronization signal (e.g. a sync pulse used in accordance with the conventional SPC communication protocol from the secondary device 350).

Thus, in accordance with such embodiments, the secondary device 350 may encode the data in the transmitted data bit groups in terms of the time base of the primary device 300 instead of its own time base, as is the case for the conventional SPC communication protocol. The primary device 300 may then decode the transmitted data bit groups using its own time base without the need for clock calibration. This obviates the need for the secondary device 350 to transmit the sync pulse, advantageously reducing the latency of communications between the primary and secondary devices 300, 350.

Figure 6:
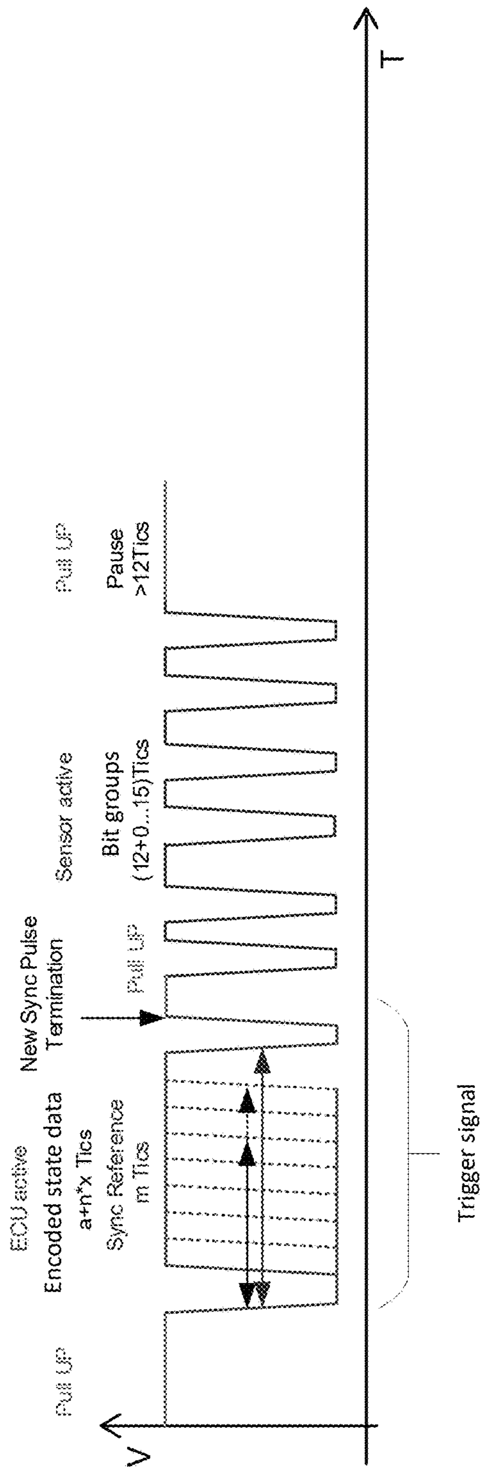
Figure 7:
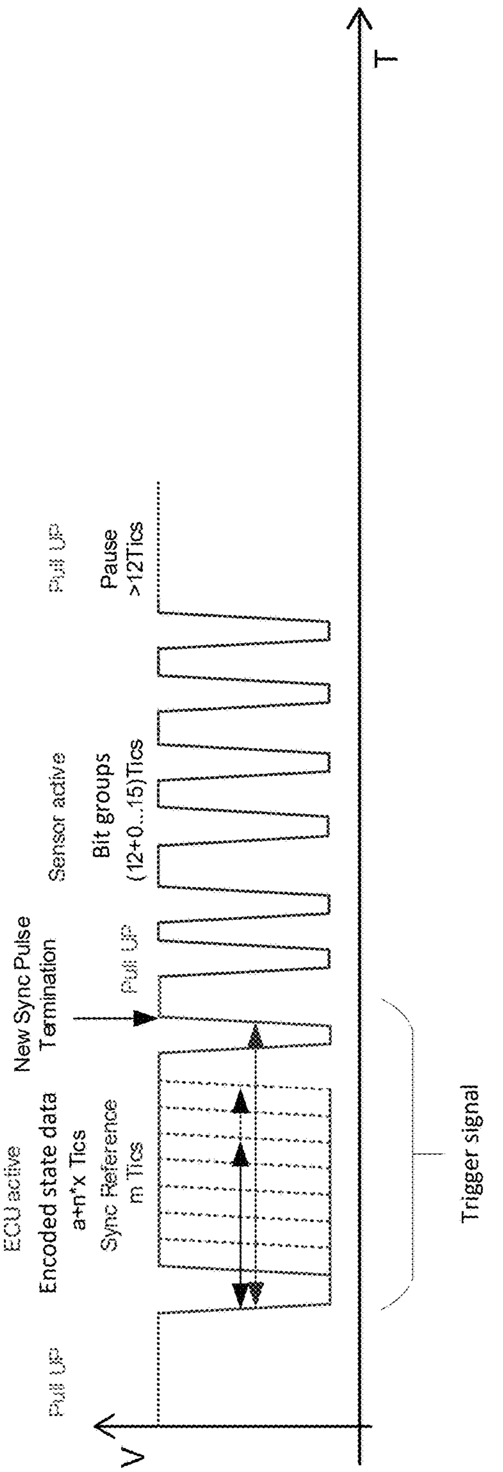
Figure 8:
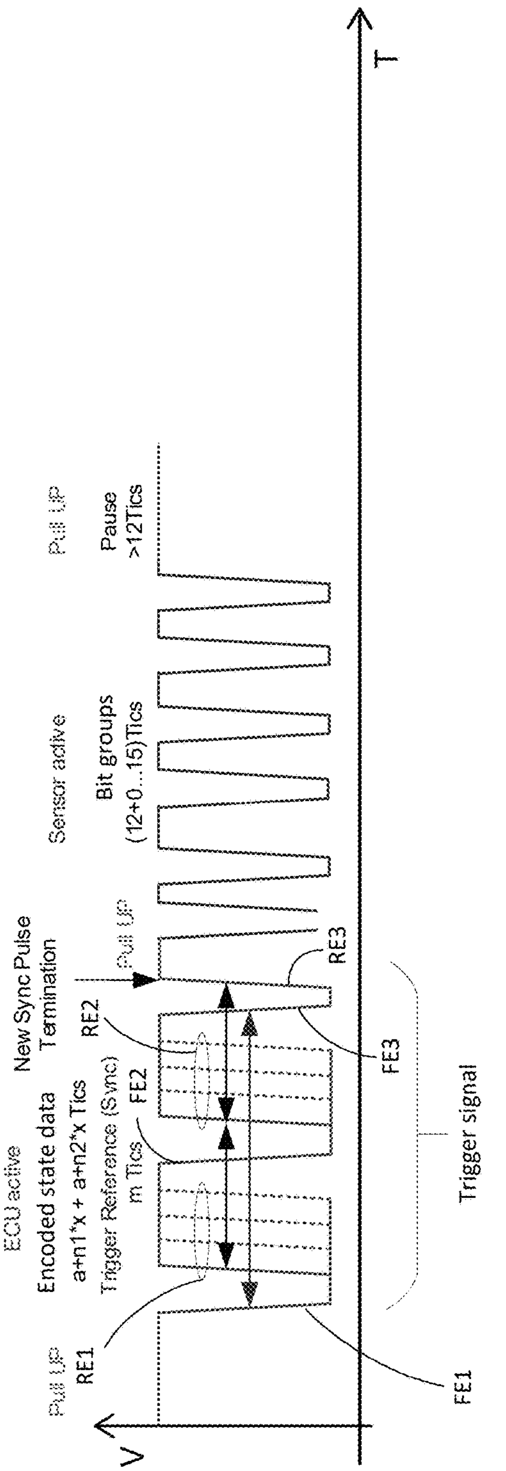

The manner in which the time base reference of the primary device 300 and the state data are encoded in the trigger signal is shown in FIGS. 4 and 5A, which represents one such example. FIGS. 5B, 6, and 7 illustrate alternative examples of how the trigger signal may encode the time base reference of the primary device 300 and the state data. For each of the trigger signals as shown in FIGS. 6 and 7, the trigger signal may have the same shape as that of the trigger signal shown in FIGS. 4 and 5A above, and in each case also be received, decoded, and used by the secondary device 350 in the same manner as discussed above with respect to FIGS. 4 and 5A. However, and as described in further detail below, the trigger signal as shown in FIGS. 5B and 8, the trigger signal may have a different shape as that of the trigger signal shown in FIGS. 4 and 5A above, although in each case the trigger signal may also be received, decoded, and used by the secondary device 350 in the same manner as discussed above with respect to FIGS. 4 and 5A.

Additionally, although FIGS. 5B and 6-8 illustrate a signaling scheme that does not include the transmission of a sync pulse via the secondary device 350, as was discussed with respect to FIG. 5A, this is by way of example and not limitation. In other embodiments, the signaling schemes as shown in FIGS. 5B and 6-8 may include the secondary device 350 transmitting the sync pulse as shown in FIG. 4, which may be used by the primary device 300 to adapt its clock frequency as discussed above.

FIG. 5B illustrates a trigger signal that may be a different shape as that shown in FIG. 5A, and in this case also includes four edges, which includes a first falling edge followed by a first rising edge, a second falling edge, and a second rising edge. The time base reference of the primary device 300 is encoded in the trigger signal as shown in FIG. 5B between two edges having the same direction, as was the case in FIG. 5A. However, for the trigger signal as shown in FIG. 5B, the time base reference of the primary device 300 is encoded in the trigger signal by way of the duration of time measured between the first and the second rising edges instead of the first and second falling edges as discussed above with respect to FIGS. 4 and 5A. Additionally, for the trigger signal in FIG. 5B, the state data is also encoded as a duration of time between two edges having the same direction, as was the case in FIG. 5A. However, instead of being encoded by way of the duration of time measured from the first falling edge to the first rising edge, the state data of the trigger signal as shown in FIG. 5B encodes the state data as a time measured from the first falling edge to the second falling edge. In other words, for the encoding of the state data for the trigger signal as shown in FIG. 5B, the state data is encoded by way of a variable temporal position of the second falling edge with respect to a fixed temporal position of the first falling edge based upon the state data to be encoded.

FIG. 6 illustrates a trigger signal that may be the same shape as that shown in FIGS. 4 and 5A, and thus also includes a first falling edge followed by a first rising edge, a second falling edge, and second rising edge. The time base reference of the primary device 300 is also encoded in the trigger signal as shown in FIG. 6 by way of the duration of time measured between the first and the second falling edges, as discussed above with respect to FIGS. 4 and 5A. However, for the trigger signal in FIG. 6, the state data is instead encoded by way of the duration of time measured from the first falling edge to the first rising edge, which also has a variable temporal position in this example based upon the state data to be encoded.

In this example, the communication circuitry 306 may be configured to modulate the DATA line to vary a temporal position of the first rising edge by a predetermined time period with respect to the first falling edge to encode each one of a set of state data. As noted above, each state (in the set of state data) is thus encoded as a predetermined duration of time, but in this example is measured from the first falling edge of the trigger signal, and is represented in terms of 'x' tics with respect to the primary device 300 time base. As was the case for the trigger signal encoding as discussed above with respect to FIGS. 4 and 5A-5B, the variable first rising edge may be temporally shifted within the trigger signal by a+(n*x) tic values depending upon the particular state to be encoded, with x tics representing the duration of each time-encoded state n.

FIG. 7 illustrates a trigger signal that may have the same shape as that shown in FIGS. 4 and 5A, and thus also includes a first falling edge followed by a first rising edge, a second falling edge, and second rising edge. As was the case for the encoding described with respect to FIG. 6, the trigger signal as shown in FIG. 7 also encodes each state (in the set of state data) as a predetermined duration of time measured from the first falling edge, which again is represented in terms of 'x' tics with respect to the primary device 300 time base. However, the trigger signal as shown in FIG. 7 alternatively encodes the time base reference of the primary device 300 by way of the duration of time measured between the first falling edge and the second rising edge.

Turning now to FIG. 8, an alternative trigger signal is shown that has a different shape than those discussed above with respect to FIGS. 4-7, and also encodes the state data and the time base reference of the primary device 300 in a different way. For instance, the trigger signal as shown in FIG. 8 includes two separate pulses, and thus comprises six edges, which include the three rising edges RE1, RE2, RE3, as well as three falling edges FE1, FE2, FE3 as shown. The trigger signal starts with the first falling edge FE1 and terminates with the third rising edge RE3. Although two different pulses are shown, this is by way of example and not limitation, and the trigger signal may include any suitable number of separate pulses, with the overall length of the trigger signal thus having a duration between the first falling edge and the last rising edge in each case.

The trigger signal as shown in FIG. 8 may still encode the time base reference of the primary device 300, which in this example may be encoded by way of the length of time measured between the first and last falling edges FE1, FE3. And, as was the case for the encoding schemes described above with respect to FIGS. 4, 5A, and 5B, each of the rising and falling edges of the trigger signal have a temporal position that is fixed with respect to one another per trigger signal transmission with the exception of, in this example, the first and second rising edges RE1, RE2, which are used to encode the state data.

Thus, the use of additional pulses in this example enables the trigger signal to encode additional state data per single transmission (e.g. one per pulse) while still providing the time base reference of the primary device 300. By encoding different state data in this manner, the trigger pulse may convey multiple states, which may comprise separate instructions, commands, etc., or a portion of a larger encoded value representing a command, instruction, etc. As an illustrative example, the first state data may encode the MSBs of a larger encoded value, whereas the second state data may encode the LSBs of this larger encoded value, or vice-versa.

In the example as shown in FIG. 8, first state data is encoded in the trigger signal as a predetermined length of time between the first and the second rising edge RE1, RE2, and second sensor state data is encoded in the trigger signal as a length of time between the second and the third rising edges RE2, RE3. Thus, although the first and second rising edges are variable and may change based upon the state data to be encoded, each is still referenced to the fixed third rising edge RE3. Thus, the secondary device 350 may measure the time between the second rising edge RE2 and the third rising edge RE3 to decode the second state data, and also measure the additional time from the second rising edge RE2 to the first rising edge RE1 to decode the first state data.

The specific edges used to encode the state data in this manner are illustrated in FIG. 8 by way of example and not limitation, and any other edges may be used to encode the state data and/or the time base reference of the primary device 300. For example, the first and the second state data may be encoded as a length of time measured from the first falling edge FE1, as discussed above with respect to FIGS. 6 and 7. Alternatively, the first state data may be encoded as a length of time measured from the first falling edge FE1, whereas the second state data may be encoded as a length of time measured from the third rising edge RE3. Thus, any suitable combination of the falling and rising edges of the trigger signal may be used to encode the state data as well as the time base reference of the primary device 300. As another example, the time base reference of the primary device 300 may be encoded as a length of time measured between the first falling edge FE1 and the third rising edge RE3, as was the case for the trigger signal encoding discussed with respect to FIG. 7.

It is noted that the polarity and/or timing of the pulses of the trigger signal may be constructed in a manner that allows the receiving secondary device 350 to differentiate the trigger signal from other data bit group transmissions. For instance, multiple secondary devices may transmit data on the same bus to the primary device 300, and thus these data bit groups may be received by the other secondary devices. Thus, the trigger signal may be constructed such that a secondary device 350 receiving data bit group transmissions from other secondary devices does not interpret these transmissions as a trigger signal. For example, to prevent this, the trigger pulses of the trigger signal may have length that violates the maximum duration of 27 tics per bit groups duration as defined in accordance with the conventional SPC communication protocol.

Section II: SPC with Variable Data Frame Length

With respect to the conventional SPC communication protocol, it is noted that data frame structures are predefined. For instance, the SPC communication protocol may be operated in accordance with different variants, each defining a preset number of data bit groups to be used for message transmissions, which typically varies between 5 and 9 data bit groups per data frame transmission. For example, reference is again made to FIG. 1, where it is shown that each SPC data frame ends with a pause pulse having a predefined duration (e.g. 12 tics), which delivers a falling edge for the evaluation of the last data bit group. The pause pulse leads into the pull up phase, during which time the secondary device 350 awaits the next trigger pulse transmission. The primary device 300 may thus transmit the next trigger pulse only after expiration of the predefined duration (e.g. 12 tics) of the pulse by identifying the position of the pause pulse in the data frame.

Thus, once a particular variant is selected for use for an application, the data frame is fixed in length. This represents a significant disadvantage in that the transmission of messages that exceed the predefined 5-9 bit group may only be transmitted as part of subsequent data frames. The use of larger message transmissions may be particularly useful for security-based applications, which may utilize the exchange large random numbers during a startup phase. However, the transmission of several data frames to communicate such information requires the primary device 300 to transmit a trigger pulse and the secondary device 350 to transmit a sync pulse, followed by the pause pulse, which creates additional bandwidth overhead and latency. Thus, for such security-based applications in particular, the overhead of the SPC protocol (sync pulse, reference pulse, pause pulse) extends the duration of this exchange phase during startup.

To address these issues, the embodiments described in this Section introduce an end-of-frame (EoF) signal as part of the data frame transmitted by the secondary device 350. To do so, reference is now made to FIG. 9, which illustrates one example of the use of an EoF signal. As shown in FIG. 9, the trigger signal may be transmitted by the primary device 300 as a trigger pulse in accordance with the conventional SPC protocol. Alternatively, the trigger signal may be transmitted in accordance with any of the embodiments discussed above with respect to Section I.

In response, the secondary device 350 generates (e.g. via the processing circuitry 352) a data frame, which may include the calculation of the temporal modulation of the DATA line via the processing circuitry 356 to result in the transmission as shown in FIG. 9. The data frame may thus optionally include the sync pulse (e.g. when the conventional SPC protocol pulse is implemented) as well as a number of data bit groups that encode the message content to be transmitted by the secondary device 350, and the end-of-frame signal. The communication circuitry 356 thus transmits this data frame to the communication path via modulation of the DATA line, as discussed herein with respect to Section I. Thus, with the exception of the EoF signal and the resulting ability to utilize a variable data frame length, the transmissions between the primary and secondary device 300, 350 may otherwise comply with the conventional SPC communication protocol, excepting for the optional use of the alternative trigger signal as discussed herein.

Thus, each one of the transmitted data bit groups may represents data that is encoded as a respective length of time that is within a predetermined range of time in accordance with conventional SPC communication protocol. For example, it is noted that each of the conventional SPC communication protocol variants define the bit group length (e.g. a nibble length) between 12 and 27 tics. After the expiration of this time period, which again is a function of the data that is encoded per bit group, the secondary device 350 then transmits the pause pulse and the DATA line returns to the pull up state.

Thus, for the example scheme as shown in FIG. 9, the secondary device 350 generates the EoF signal having a length of time that exceeds any suitable maximum threshold value that is recognized by the primary device 300 as violating the conventional SPC communication protocol. This enables the primary device 300 to thereby identify a terminated transmission of the plurality of data bit groups, which facilitates the use of a variable data frame size. For example, the EoF signal may have a length of time that exceeds the upper time value (e.g. 27 tics) of the predetermined range of time that is defined conventional SPC communication protocol (e.g. 12-27 tics). Otherwise, until the EoF signal is transmitted and recognized by the primary device 300, the secondary device 350 may continue to transmit data bit groups, thereby achieving a data frame of any suitable length based upon the size of the message to be transmitted.

To this end, it is noted that FIG. 9 is directed to a "passive" generation of the EoF signal in this manner. In accordance with such embodiments, the secondary device 350 is configured to generate the EoF signal by initially driving the DATA line to the lower reference voltage value, and then releasing the DATA line for a time period that exceeds the maximum threshold value that is recognized by the primary device 300 as violating the conventional SPC communication protocol. Thus, the EoF signal is shown in FIG. 9 as being measured from the falling edge of the EoF signal that is pulled down by the secondary device 350, which is then followed by the secondary device releasing the DATA line to signal the end of a data frame transmission, which results in the DATA line being pulled up to the higher voltage value V. The passive embodiments as described with respect to FIG. 9 advantageously do not require a change to the secondary device 350 minimum driver capability to achieve the desired slew rates for such communications.

In this way, the primary device 300 may recognize a data frame as having a variable frame length via the processing circuitry 402 determining whether no new rising edge occurs before the expiration of the maximum threshold value (e.g. 27 tics). In other words, the EoF signal is intentionally constructed to violate the maximum predetermined bit group length associated with the conventional SPC communication protocol, and the primary device 300 is configured to differentiate such an EoF signal from a data bit group in this manner. As a result, the data frame transmitted by the secondary device 350 may have any suitable number of data bit groups instead of the preset number defined in accordance with a single SPC protocol variant. For example, the data frame transmitted by the secondary device 350 may have a number of data bit groups that exceed a threshold (e.g. maximum) number of data bit groups as defined by the conventional SPC communication protocol.

Turning now to FIG. 10, an "active" generation of the EoF signal is shown. In accordance with such embodiments, the secondary device 350 is configured to generate the EoF signal by driving the DATA line to the lower reference voltage value, and maintains the DATA line at this lower reference voltage value for a time period that exceeds a maximum threshold value, and then releases the DATA line. Thus, the length of time of the EoF signal in this example comprises the time period between the falling edge and a rising edge of the end-of-frame signal. Again, this maximum threshold value may be one that ensures that the primary device 300 recognizes that the EoF signal is not a data bit group transmission by exceeding the maximum threshold value that is recognized by the primary device 300 as violating the conventional SPC communication protocol.

For the example shown in FIG. 10, the maximum threshold value may be further increased from the passive EoF signal to avoid ambiguities when operating in bus mode. For instance, if the maximum threshold value is 27 tics, then the EoF signal may possibly be interpreted by other secondary devices on the same bus as a new trigger pulse. Thus, for the active EoF signal embodiments discussed with respect to FIG. 10, the EoF signal may have a length of time when operating in the bus mode that is further increased to exceed the maximum duration of the conventional SPC protocol trigger pulse of 65 tics for example.

Turning now to FIG. 11, the active embodiments of FIG. 10 may be further modified such that the secondary device 350 generates the EoF signal having a length of time that exceeds any suitable minimum threshold value that is recognized by the primary device 300 as violating the conventional SPC communication protocol. Again, this enables the primary device 300 to thereby identify a terminated transmission of the plurality of data bit groups, which facilitates the use of a variable data frame size. To do so, the secondary device 350 may generate the EoF signal as two consecutive pulses as shown in FIG. 11, with the length of time of the end-of-frame signal being measured as a time period between the two falling edges (or alternatively, two falling edges or any other combination of rising and falling edges) of these two consecutive pulses. For example, the EoF signal may have a length of time that is less than the minimum time value (e.g. 12 tics) of the predetermined range of time that is defined conventional SPC communication protocol (e.g. 12-27 tics).

The use of the variable length data frame in this manner may enable the use of different message sizes (e.g. different numbers of data bit groups) based upon the particular application. Advantageously, the data frame size may be adapted based upon the type of data being transmitted. A predetermined scheme may thus be established between the primary and secondary devices 300, 350 to ensure that specific types of data content of different messages are recognized by the primary device 300.

For example, one data frame configuration associated with a predetermined number of data bit groups (e.g. 6, 8, etc.) may be defined for sensor data frames, whereas another data frame configuration associated with a predetermined number of data bit groups (e.g. 12, 14, etc.) may be defined for the exchange of data for security (e.g. a random number value). Continuing this example, a data content code may be specified in a defined position of the data frame, such as in a predetermined data bit group position. This specific data bit group may encode a value that is interpreted by the primary device 300 as being correlated to a specific type of data frame content and expected message length. For instance, a data content code may be encoded as part of one of the data bit groups at a predetermined position (e.g. the first data bit group) to encode N bits to differentiate 2/\N different types of data frame content.

Further continuing this example, some data bit groups may have a fixed content specification with respect to the start or end of the data frame, which is known and recognized by the primary device 300. This may include, for example, the first data bit group, the second to last data bit group, the last data bit group, etc. To provide an illustrative example, the first data bit group may encode status bits and ID in accordance with the conventional SPC communication protocol. As another illustrative example, the first data bit group may encode status bits and serial message bits in accordance with the conventional SPC communication protocol. As yet another illustrative example, the last data bit group may encode a CRC value in accordance with the conventional SPC communication protocol.

As another illustrative example, the secondary device 350 may transmit an additional synchronization signal (e.g. a sync pulse as shown in FIGS. 9-11) as part of the data frame, which may be transmitted at a predetermined location within the data frame. For instance, the synchronization signal may be transmitted subsequent to the plurality of data bit groups (not shown), and again encodes a time base reference of the secondary device 350 as discussed herein. The synchronization signal may terminate the message transmitted by the secondary devise 350 in this manner, e.g. by immediately preceding the EoF signal as shown. Other sensors configured to also recognize the EoF signal may thus likewise interpret the synchronization signal and use the encoded time base to calibrate their own clock frequencies as noted herein. In this way, the other secondary devices need not subsequently transmit their own sync pulse, increasing the speed of communications by reducing the latency associated with these transmissions.

Section III—SPC with Wake Up Signal

The embodiments discussed in Sections I and II may be implemented in accordance with the synchronous mode of operation (e.g. when a single sensor is connected to the ECU), or via the bus mode of operation (e.g. when more than one sensor is connected to the same ECU via a shared communication path). However, the embodiments discussed in further detail in this Section are directed to operation in accordance with the synchronous mode of operation in which a signaling scheme is implemented to facilitate communications between the primary and the secondary devices 300, 350. This may be particularly advantageous to provide additional flexibility for communication with sensors that may utilize or require the use of different operating states as part of their operation.

For instance, and as further discussed below, the various bus codes typically implemented as part of the trigger pulse in accordance with the conventional SPC communication protocol may be repurposed to encode state data that is transmitted to the secondary device 350 as part of the trigger signal. Additionally, because the data encoded in an SPC trigger pulse may include encoded sensor addresses, the trigger pulse need not encode such data when operating in the synchronous mode of operation. Therefore, the trigger signal as discussed in further detail in this Section may implement a state signal to encode additional state data in lieu of the use of the SPC trigger pulse. Additionally, the secondary device 350 may operate in a low power mode of operation, and the trigger signal transmitted by the primary device 300 may include a wake up signal that is recognized by the secondary device 350. As a result, the secondary device 350 may then transition from the low power mode of operation to a different mode of operation.

As part of the transmission of the trigger signal, in accordance with the present embodiments, the primary device 300 may be configured (e.g. via the processing circuitry 302) to generate state data, which is then encoded as part of a transmitted trigger signal that also includes a wake up signal, as shown in FIG. 12. To do so, and as discussed herein, the communication circuitry 306 may be configured to modulate the voltage state of the DATA line to thereby transmit the trigger signal that includes the wake up signal and the state signal, as illustrated in FIG. 12. In this way, the communication circuitry 306 may be configured to transmit the trigger signal over the communication path to initiate communication with the secondary device 350 in accordance with the SPC communication protocol.

In accordance with the embodiments described in this Section, the secondary device 350 may be configured to operate in different modes based upon respective conditions being met. For instance, the secondary device 350 may be instructed by the primary device 300 (e.g. via the data encoded in the state signal, as discussed in further detail below) to transition to a specific mode of operation. As another example, the secondary device 350 may be configured to transition to a specific mode of operation, which may include transitioning back to a low power operation or to another mode of operation (e.g. the active mode of operation as discussed herein) after a predetermined period of time has elapsed during which the secondary device 350 has remained in the low power mode.

In any event, prior to the transmission of the trigger signal as shown in FIG. 300 via the primary device 300, it is assumed that the secondary device 350 is operating in a low power mode of operation. This may include any suitable number of components of the secondary device 300 being powered down or placed into a lower power state compared to operation in an active mode of operation. As an illustrative example, the secondary device 350 may operate in accordance with an active mode of operation during which the sensor circuitry 354 actively performs sensor measurements either continuously or in accordance with a predetermined sampling frequency. In the active mode of operation, the processing circuitry 352 and the communication circuitry 356 may transmit the measured sensor data to the primary device 300 in accordance with the SPC communication protocol for instance.

However, during the low power mode of operation, the sensor circuitry 354 may be inactive and thus the secondary device 350 may not actively perform sensor measurements. Alternatively, the sensor circuitry 354 may perform sensor measurements with a reduced frequency compared to the active mode of operation. Additionally or alternatively, the low power mode of operation may include portions of the processing circuitry 352 and/or the communication circuitry 356 being fully or partially powered down compared to the active mode of operation. Nonetheless, during the low power mode of operation, the communication circuitry 356 (or at least a portion thereof) may continue to monitor the state of the DATA line and thus receive and process the trigger signal when transmitted by the primary device 300.

Again, the trigger signal transmitted by the primary device 300 may include a wake up signal and a state signal. The wake up signal may encode a wake up command via PWM by way of a predetermined length of time of the wake up signal, which is measured and recognized by the secondary device 350. For instance, the wake up signal may have a duration of time that is measured by the secondary device 350 from the falling edge to the rising edge of the wake up signal as shown in FIG. 12. This may be performed, for example, in the same manner as a trigger pulse measurement in accordance with the conventional SPC communication protocol, as discussed herein.

The wake up signal may thus encode the wake up command by way of any suitable length of the wake up signal that may be differentiated by the secondary device 350 from a conventional SPC communication protocol trigger pulse. For example, the wake up signal may have a length of time that is between the predetermined lengths of time associated with the different bus codes of the SPC trigger pulse as noted herein. Additionally or alternatively, the trigger signal may include the wake up signal having a wide range in terms of tic values to allow for a secondary device to still recognize the wake up signal and state signal using its inaccurate secondary device clock. As one illustrative example, the wake up signal may have a length of time of 16 tics (e.g. ranging between 9-23 tics) or 18 tics (e.g. ranging between 8-28 tics), for instance. As another illustrative example, the wake up signal may have a length of time of 25 tics (e.g. ranging between23-27 tics or e.g. ranging between22-28 tics), for instance. As yet another illustrative example, the wake up signal may be shorter than the standard SPC trigger pulse minimum length of 11 tics, or longer than the standard SPC trigger pulse maximum length of 65 tics. It is noted that the wake up signal may be of any suitable length that is recognized by the secondary device 350 as being different from a standard SPC trigger pulse, with the aforementioned lengths being provided by way of example and not limitation.

Thus, upon receiving and recognizing the encoded wake up command by way of the predetermined length of time of the wake up signal, the secondary device 350 may transition from the low power mode of operation to the active mode of operation. The secondary device 350 may receive the state signal in the low power mode of operation or, alternatively, after transitioning to the active mode of operation. In either case, the secondary device 350 may then decode the state data that is encoded in the state signal to perform a corresponding action based upon the state data.

To this end, it is noted that the state signal encodes the state data as a length of time of the sensor state signal, as noted above for example, in Section I with respect to the trigger signal. For instance, and as discussed in Section I above, the encoded state data may represent any suitable instruction, command, etc., which is recognized by the secondary device 350 and, in response, causes a predetermined response by the secondary device 350. Thus, the processing circuitry 302 may be configured to generate the sensor state data based upon the particular instruction, command, data, etc., that is to be conveyed to the secondary device 350. Again, the state data may be PWM-encoded in the same manner as the conventional SPC communication protocol, e.g. by way of varying the length of the state signal, as shown in FIG. 12. For example, the state signal comprises a falling edge and a rising edge, as shown in FIG. 12. For instance, the state signal may be encoded via modulation of the DATA line by the communication circuitry 356 by varying a length of time between the falling edge and the rising edge such that the sensor state data represents one of a set of sensor state data.

The transmission of the wake up signal and the state signal in this manner may thus replace the transmission of a trigger pulse in accordance with the SPC protocol as discussed with respect to FIG. 1 for instance. However, in doing so, the state signal may alternatively encode different commands using the same predetermined tic lengths and number of bus codes as those implemented for the conventional SPC trigger pulse or, alternatively, using tic lengths and/or a number of bus codes that differ from the SPC trigger pulse.

For example, in some embodiments, the state signal may implement the same predetermined tic lengths of 11, 21, 38, and 65 tics in accordance with the conventional SPC trigger pulse to encode four different bus codes, each representing a two-bit value. As another example, the state signal may implement different predetermined tic lengths than those used in accordance with the conventional SPC trigger pulse to encode four different bus codes, each representing a two-bit value. As yet another example, the state signal may have a length of time that extends the SPC trigger pulse to more than four different bus codes, each representing a bit value of three or more bits for example. For instance, the state signal may extend the SPC trigger pulse to include one or more additional bus codes.

As one illustrative example, the state signal may encode five bus codes by implementing, to encode a fifth bus code, a length of the state signal having a range between 102-116 tics, whereas the other four bus codes may be encoded using a length of time as defined in accordance with the conventional SPC trigger pulse. The state signal length and/or encoding of state data in this manner are not limited to these examples, and the state signal may encode any suitable number of states in any suitable manner using a PWM encoding scheme as discussed herein. As yet another illustrative example, the state signal may comprise the trigger signal as discussed above in Section I, with the secondary device optionally using the time base reference of the primary device 300 to decode the encoded state data when the time base reference of the primary device 300 is transmitted as part of the state signal.

The state data may thus encode any suitable number and/or type of different state data, which may represent instructions, commands, configurations, etc., that are recognized by the secondary device 350 as discussed herein. The number and/or types of states encoded via the state signal in this manner may be a function of the capabilities of the secondary device 350 (e.g. the type of sensor) as well as the particular application in which the secondary device 350 is implemented. This may include, for instance, a command that instructs the secondary device 350 to transition to a different operating state, such as a transition from the active mode of operation back to the low power mode of operation, a transition to a continuous measurement sampling mode, a transition to a sampling mode in which sensor measurements are performed with a different frequency than the current operating mode, a transition to measure different types of sensor data, etc. As yet additional examples, this may include a command that toggles a specific bit maintained by the secondary device 350 (e.g. a custom or "customer" bit), an acknowledgment by the primary device 300 of errors and warnings previously reported by the secondary device 350, etc.

As an illustrative example, the secondary device 350 may be implemented as a turns counter, which uses internal angle information to count quadrants or octants, generally with an accuracy of ±10°. The turns counter may output the quadrant information on request of the primary device 300, with such a request being encoded as one state that may be transmitted via the state signal. The turns counter may also output an available x-and y-angle information during a continuous mode, and the transition to this continuous state may be encoded as another state transmitted via the state signal. The turns counter may also switch to the low power mode of operation and read a counter value, and the transition to this state may be encoded as another state transmitted via the state signal. Still further, a turns counter may also reset its counter value, and this may be performed in response to an instruction to do so that may be encoded as another state transmitted via the state signal. Additional state data encoded for such an implementation of a turns counter may include an acknowledgment of error and warnings by the primary device 300 and/or an instruction to toggle a customer bit, for instance.

The secondary device 350 may thus respond to the state data encoded in the state signal based upon the particular application, and in response transmit data to the primary device 300. This may include, for instance, the transmission of data in accordance with the SPC communication protocol as discussed herein. For example, and as shown in FIG. 12, the secondary device may transmit the sync frame, which includes the encoded time base of the secondary device 350, as well as a status bit group, two error bit groups, four data bit groups, a CRC, and an end pulse. This transmission may, for example, comply with the SPC communication protocol, and thus the transmission of each bit group may comprise 3 or 4 bits (e.g. data nibbles) as so defined. Alternatively, the data transmission may deviate from the SPC communication protocol in one or more ways. As one illustrative example, the secondary device 350 may transmit the data bit groups in accordance with the variable frame length embodiments as discussed above in Section II, which may implement the EOF signal (not shown in FIG. 12).

Again, in each of the embodiments as discussed herein the Sections I-III, different schemes are used to encode data and/or implement signals in a manner that may deviate from the use the conventional SPC communication protocol. As noted herein, such schemes may be recognized by the primary device 300 and/or the secondary device 350 in accordance with predetermined modifications. The primary device 300 and/or the secondary device 350 may implement this functionality by, for example, updating their respective program memories 320, 370 in accordance with the particular scheme that is implemented. The processing circuitry 302, 352 may then execute the instructions associated with the program memories 320, 370, respectively, to recognize and respond to such modifications of the SPC communication protocol.

EXAMPLES

The techniques of this disclosure may also be described in the following examples.

Example 1. A device configured to communicate with a sensor via a communication path, the device comprising: processing circuitry configured to generate (i) a time base reference for the device that is based upon a device clock frequency, and (ii) sensor state data; and communication circuitry configured to transmit a trigger signal over the communication path to initiate communication with the sensor in accordance with a pulse width modulation (PWM) code protocol, wherein the trigger signal comprises at least four edges including two edges having a first direction and two edges having a second direction that is different than the first direction, and encodes the time base reference and the sensor state data, and wherein the time base reference enables the sensor to decode the sensor state data encoded in the trigger signal.

Example 2. The device of Example 1, wherein the time base reference further enables the sensor to calibrate a sensor clock frequency.

Example 3. The device of any combination of Examples 1-2, wherein the trigger signal encodes the time base reference as a duration of time between two of the at least four edges having the same direction.

Example 4. The device of any combination of Examples 1-3, wherein the trigger signal encodes the time base reference as a duration of time between two of the at least four edges having a different direction.

Example 5. The device of any combination of Examples 1-4, wherein the trigger signal encodes the sensor state data from among a set of state data by varying a temporal position between two of the at least four edges having the same direction.

Example 6. The device of any combination of Examples 1-5, wherein the trigger signal encodes the sensor state data from among a set of state data by varying a temporal position between two of the at least four edges having a different direction.

Example 7. The device of any combination of Examples 1-6, wherein the trigger signal encodes the sensor state data from among the set of state data by varying a temporal position of one of the at least four edges with respect to another one of the at least four edges by a respective predetermined time period to encode each one of a set of state data.

Example 8. The device of any combination of Examples 1-7, wherein the device is configured to receive, in response to transmitting the trigger signal, sensor data from the sensor in accordance with the PWM code protocol.

Example 9. The device of any combination of Examples 1-8, wherein the device is configured to receive the sensor data from the sensor in accordance with the PWM code protocol without receiving a synchronization signal from the sensor.

Example 10. The device of any combination of Examples 1-9, wherein: the trigger signal comprises at least six edges including two further edges occurring subsequent to the two edges having the first direction and the two edges having the second direction, with one of the two further edges having the first direction and another one of the two further edges having the second direction, the sensor state data comprises first and second sensor state data, the first sensor state data is encoded in the trigger signal as a length of time between a first and a second one of the at least six edges, and the second sensor state data is encoded in the trigger signal as a length of time between a second and a third one of the at least six edges.

Example 11. The device of any combination of Examples 1-10, wherein: the time base reference is encoded in the trigger signal as a length of time between a fourth and a fifth one of the at least six edges.

Example 12. A sensor configured to communicate with a device via a communication path, the sensor comprising: processing circuitry configured to generate a data frame; and communication circuitry configured to transmit the data frame to the communication path, the data frame comprising a plurality of data bit groups and an end-of-frame signal, wherein each one of the plurality of data bit groups is transmitted over the communication path as a respective data pulse, and represents data that is encoded as a respective length of time that is within a predetermined range of time in accordance with a pulse width modulation (PWM) code protocol, and wherein the end-of-frame signal has a length of time that is outside the predetermined range of time to enable the device to identify a terminated transmission of the plurality of data bit groups.

Example 13. The sensor of Example 12, wherein the data frame comprises a number of data bit groups that exceeds a threshold number of data bit groups defined by the PWM code protocol.

Example 14. The sensor of any combination of Examples 12-13, wherein the length of time of the end-of-frame signal exceeds an upper time value of the predetermined range of time.

Example 15. The sensor of any combination of Examples 12-14, wherein the length of time of the end-of-frame signal comprises a time period between a falling edge and a rising edge of the end-of-frame signal.

Example 16. The sensor of any combination of Examples 12-15, wherein the communication circuitry is configured to generate the end-of-frame signal by driving a bus associated with the communication path to a predetermined voltage level and then releasing the bus for a time period that exceeds an upper time value of the predetermined range of time.

Example 17. The sensor of any combination of Examples 12-16, wherein the length of time of the end-of-frame signal is less than a lower time value of the predetermined range of time.

Example 18. The sensor of any combination of Examples 12-17, wherein the end-of-frame signal comprises two consecutive pulses, and wherein the length of time of the end-of-frame signal comprises a time period between two falling edges of the two consecutive pulses.

Example 19. The sensor of any combination of Examples 12-18, wherein the data frame further comprises a synchronization signal occurring subsequent to the plurality of data bit groups, which encodes a time base reference of the sensor that is based upon a sensor clock frequency, and wherein the time base reference enables a further sensor to calibrate a further sensor clock frequency.

Example 20. A device configured to communicate with a sensor via a communication path, the device comprising: processing circuitry configured to generate sensor state data; and communication circuitry configured to transmit a wake up signal and a sensor state signal over the communication path to initiate communication with the sensor in accordance with a pulse width modulation (PWM) code protocol, wherein the wake up signal has a predetermined length of time that is recognized by the sensor, which causes the sensor to transition from a low power mode of operation to an active mode of operation, and wherein the sensor state signal encodes the sensor state data as a length of time of the sensor state signal.

Example 21. The device of Example 20, wherein the sensor state signal that is transmitted over the communication path replaces a transmission of a trigger pulse in accordance with the PWM code protocol.

Example 22. The device of any combination of Examples 20-21, wherein the sensor state signal comprises a falling edge and a rising edge, and wherein the sensor state signal encodes the sensor state data from among a set of sensor state data by varying a length of time between the falling edge and the rising edge.

Example 23. The device of any combination of Examples 20-22, wherein the sensor state data causes the sensor to change an operating state.

Example 24. The device of any combination of Examples 20-23, wherein the sensor state data causes the sensor to transition from the active mode of operation to the low power mode of operation.

CONCLUSION

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example, the terms "circuit" or "circuitry" used herein are to be interpreted in a sense not only including hardware but also software, firmware or any combinations thereof. The term "data" may be interpreted to include any form of representation data. The term "information" may in addition to any form of digital information also include other forms of representing information. The term "entity" or "unit" may in embodiments include any device, apparatus circuits, hardware, software, firmware, chips, or other semiconductors as well as logical units or physical implementations of protocol layers etc. Furthermore, the terms "coupled" or "connected" may be interpreted in a broad sense not only covering direct but also indirect coupling.

It is further to be noted that methods disclosed in the specification or in the claims may be implemented by a device having means for performing each of the respective steps of these methods.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations or variations of the specific embodiments discussed herein.

What is claimed is:

1. A device configured to communicate with a sensor via a communication path, the device comprising:

processing circuitry configured to generate (i) a time base reference for the device that is based upon a device clock frequency, and (ii) sensor state data; and communication circuitry configured to transmit a trigger signal over the communication path to initiate communication with the sensor in accordance with a pulse width modulation (PWM) code protocol, wherein the trigger signal comprises at least four edges including two edges having a first direction and two edges having a second direction that is different than the first direction, and encodes the time base reference and the sensor state data, and wherein the time base reference enables the sensor to decode the sensor state data encoded in the trigger signal.

2. The device of claim 1, wherein the time base reference further enables the sensor to calibrate a sensor clock frequency.

3. The device of claim 1, wherein the trigger signal encodes the time base reference as a duration of time between two of the at least four edges having the same direction.

4. The device of claim 1, wherein the trigger signal encodes the time base reference as a duration of time between two of the at least four edges having a different direction.

5. The device of claim 1, wherein the trigger signal encodes the sensor state data from among a set of state data by varying a temporal position between two of the at least four edges having the same direction.

6. The device of claim 1, wherein the trigger signal encodes the sensor state data from among a set of state data by varying a temporal position between two of the at least four edges having a different direction.

7. The device of claim 1, wherein the trigger signal encodes the sensor state data from among a set of state data by varying a temporal position of one of the at least four edges with respect to another one of the at least four edges by a respective predetermined time period to encode each one of the set of state data.

8. The device of claim 1, wherein the device is configured to receive, in response to transmitting the trigger signal, sensor data from the sensor in accordance with the PWM code protocol.

9. The device of claim 8, wherein the device is configured to receive the sensor data from the sensor in accordance with the PWM code protocol without receiving a synchronization signal from the sensor.

10. The device of claim 1, wherein:

the trigger signal comprises at least six edges including two further edges occurring subsequent to the two edges having the first direction and the two edges having the second direction, with one of the two further edges having the first direction and another one of the two further edges having the second direction, the sensor state data comprises first and second sensor state data, the first sensor state data is encoded in the trigger signal as a length of time between a first and a second one of the at least six edges, and the second sensor state data is encoded in the trigger signal as a length of time between a second and a third one of the at least six edges.

11. The device of claim 10, wherein:

the time base reference is encoded in the trigger signal as a length of time between a fourth and a fifth one of the at least six edges.

12. A sensor configured to communicate with a device via a communication path, the sensor comprising:

processing circuitry configured to generate a data frame; and communication circuitry configured to transmit the data frame to the communication path, the data frame comprising a plurality of data bit groups and an end-of-frame signal, wherein each one of the plurality of data bit groups is transmitted over the communication path as a respective data pulse, each one of the plurality of data bit groups representing data that is encoded as a respective length of time that is within a predetermined range of time defined by a pulse width modulation (PWM) code protocol for individual data bit group transmissions, and wherein the end-of-frame signal has a length of time that is outside the predetermined range of time to enable the device to identify a terminated transmission of the plurality of data bit groups.

13. The sensor of claim 12, wherein the data frame comprises a number of data bit groups that exceeds a threshold number of data bit groups defined by the PWM code protocol.

14. The sensor of claim 12, wherein the length of time of the end-of-frame signal exceeds an upper time value of the predetermined range of time.

15. The sensor of claim 12, wherein the length of time of the end-of-frame signal comprises a time period between a falling edge and a rising edge of the end-of-frame signal.

16. The sensor of claim 12, wherein the communication circuitry is configured to generate the end-of-frame signal by driving a bus associated with the communication path to a predetermined voltage level and then releasing the bus for a time period that exceeds an upper time value of the predetermined range of time.

17. The sensor of claim 12, wherein the length of time of the end-of-frame signal is less than a lower time value of the predetermined range of time.

18. The sensor of claim 12, wherein the end-of-frame signal comprises two consecutive pulses, and wherein the length of time of the end-of-frame signal comprises a time period between two falling edges of the two consecutive pulses.

19. The sensor of claim 12, wherein the data frame further comprises a synchronization signal occurring subsequent to the plurality of data bit groups, which encodes a time base reference of the sensor that is based upon a sensor clock frequency, and wherein the time base reference enables a further sensor to calibrate a further sensor clock frequency.

20. The sensor of claim 12, wherein the length of time of the end-of-frame signal that is outside the predetermined range of time violates a timing constraint defined by the PWM code protocol for data bit group transmissions.

21. A device configured to communicate with a sensor via a communication path, the device comprising:

processing circuitry configured to generate sensor state data; and communication circuitry configured to transmit a wake up signal and a sensor state signal over the communication path to initiate communication with the sensor in accordance with a pulse width modulation (PWM) code protocol, wherein the wake up signal has a predetermined length of time that is recognized by the sensor, which causes the sensor to transition from a low power mode of operation to an active mode of operation, and wherein the sensor state signal encodes the sensor state data as a length of time of the sensor state signal.

22. The device of claim 21, wherein the sensor state signal that is transmitted over the communication path replaces a transmission of a trigger pulse in accordance with the PWM code protocol.

23. The device of claim 21, wherein the sensor state signal comprises a falling edge and a rising edge, and wherein the sensor state signal encodes the sensor state data from among a set of sensor state data by varying a length of time between the falling edge and the rising edge.

24. The device of claim 21, wherein the sensor state data causes the sensor to change an operating state.

25. The device of claim 21, wherein the sensor state data causes the sensor to transition from the active mode of operation to the low power mode of operation.

* * * * *